(12) United States Patent
Fukuta et al.

(10) Patent No.: US 8,406,026 B2
(45) Date of Patent: Mar. 26, 2013

(54) POWER CONVERSION APPARATUS

(75) Inventors: Junichi Fukuta, Anjo (JP); Tsuneo Maebara, Nagoya (JP); Yusuke Shindo, Nagoya (JP); Ryotaro Miura, Aichi-ken (JP)

(73) Assignee: Denso Corporation, Kariya (JP)

( * ) Notice: Subject to any disclaimer, the term of this patent is extended or adjusted under 35 U.S.C. 154(b) by 335 days.

(21) Appl. No.: 12/877,338

(22) Filed: Sep. 8, 2010

(65) Prior Publication Data

US 2011/0058400 A1    Mar. 10, 2011

(30) Foreign Application Priority Data

Sep. 8, 2009    (JP) .................................. 2009-206723
Jul. 8, 2010    (JP) .................................. 2010-156014

(51) Int. Cl.
*H02B 1/00* (2006.01)
(52) U.S. Cl. ....................................... 363/144; 363/132
(58) Field of Classification Search .................. 363/132, 363/144, 147
See application file for complete search history.

(56) References Cited

U.S. PATENT DOCUMENTS

| 6,584,001 B2 * | 6/2003 | Ruthlein et al. ............. 363/144 |
| 2011/0058400 A1 * | 3/2011 | Fukuta et al. ................. 363/131 |

FOREIGN PATENT DOCUMENTS

| JP | P2001-359281 A | 12/2001 |
| JP | 2008-118815 | 5/2008 |
| JP | P2009-130967 A | 6/2009 |

* cited by examiner

*Primary Examiner* — Jeffrey Sterrett
(74) *Attorney, Agent, or Firm* — Nixon & Vanderhye PC

(57) ABSTRACT

The power conversion apparatus includes a power conversion circuit including parallel-connected pairs of a high-side switching element and a low-side switching element connected in series, high-side driver circuits to drive the high-side switching elements, low-side driver circuits to drive the low-side switching elements, and a transformer to supply voltages to drive the high-side switching and low-side switching elements to the high-side and low-side driver circuits. The high-side switching elements are mounted in a row along a first direction on a wiring board, and the low-side switching elements are mounted in a row along the first direction on the wiring board side by side with the row of the high-side switching elements. The transformer is mounted on the wiring board on the side of the row of the high-side switching elements opposite to the row of the low-side switching elements.

15 Claims, 19 Drawing Sheets

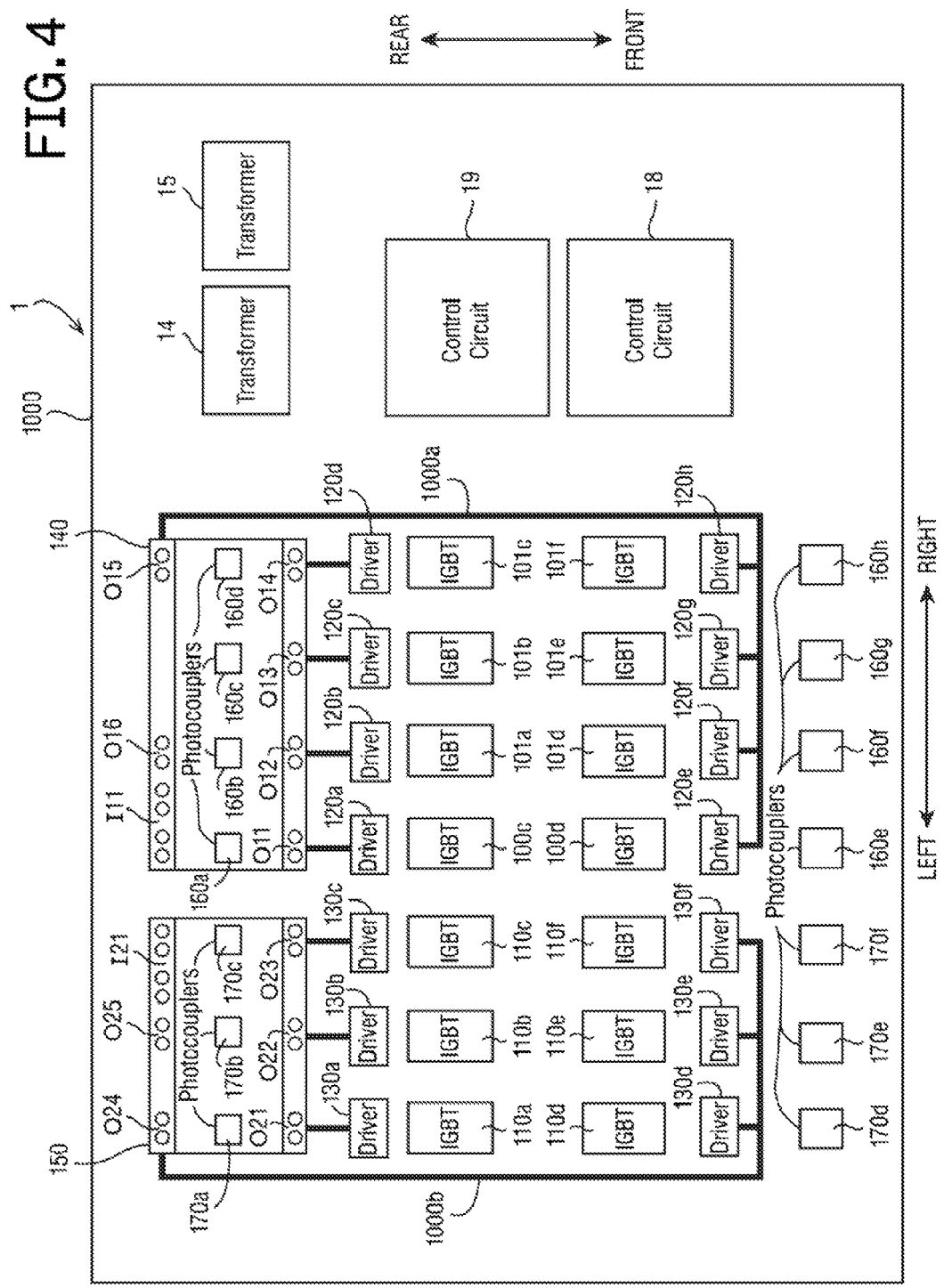

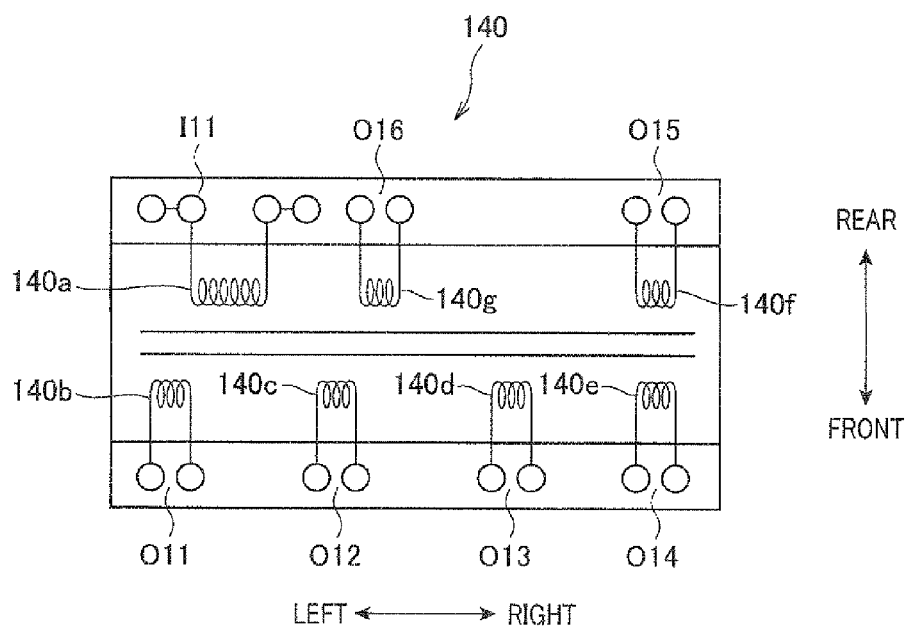
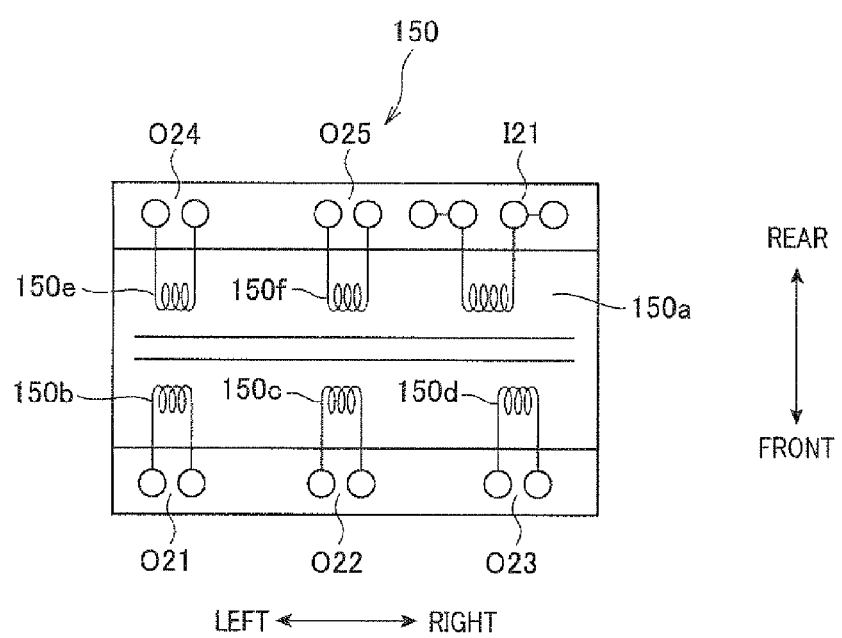

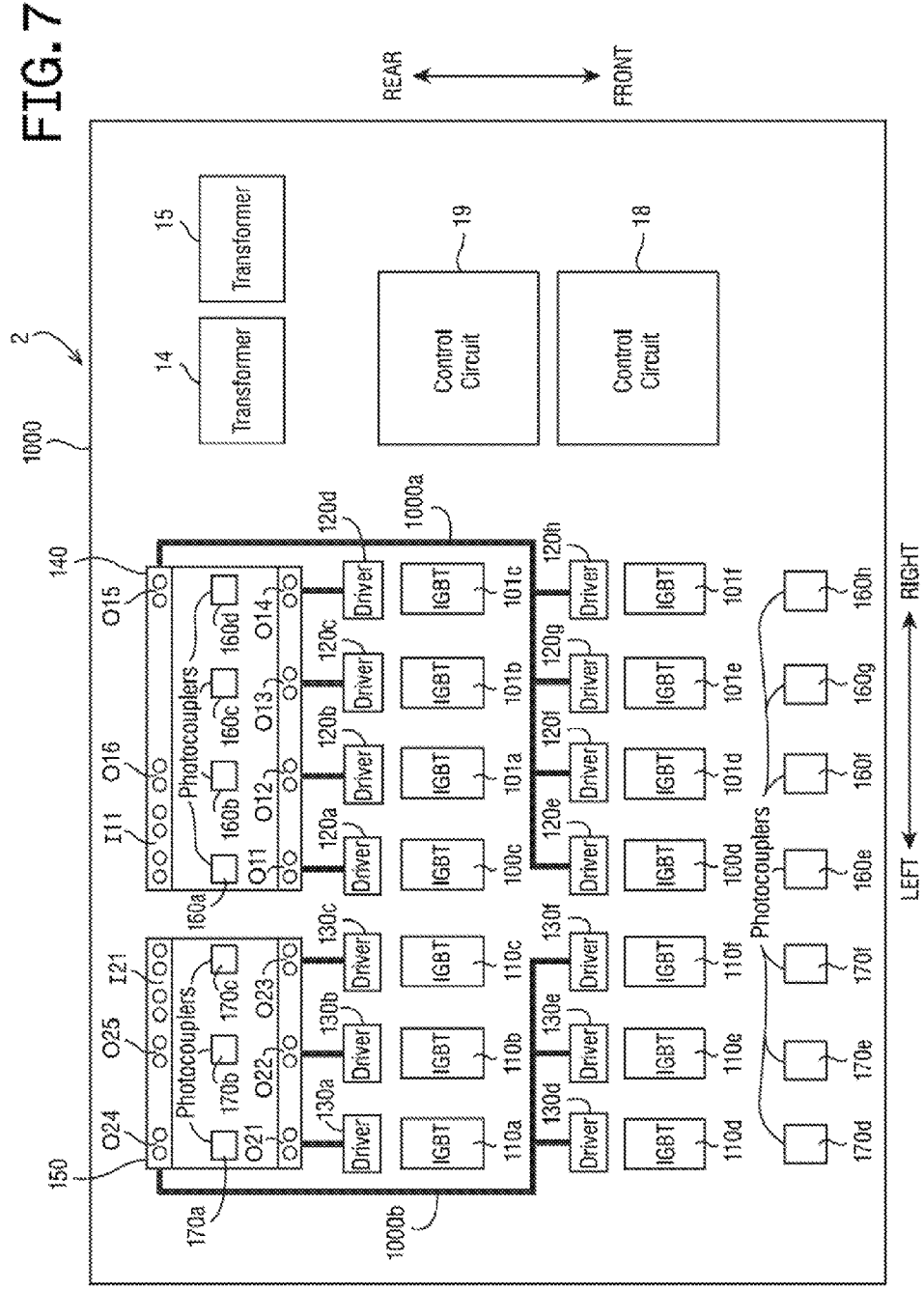

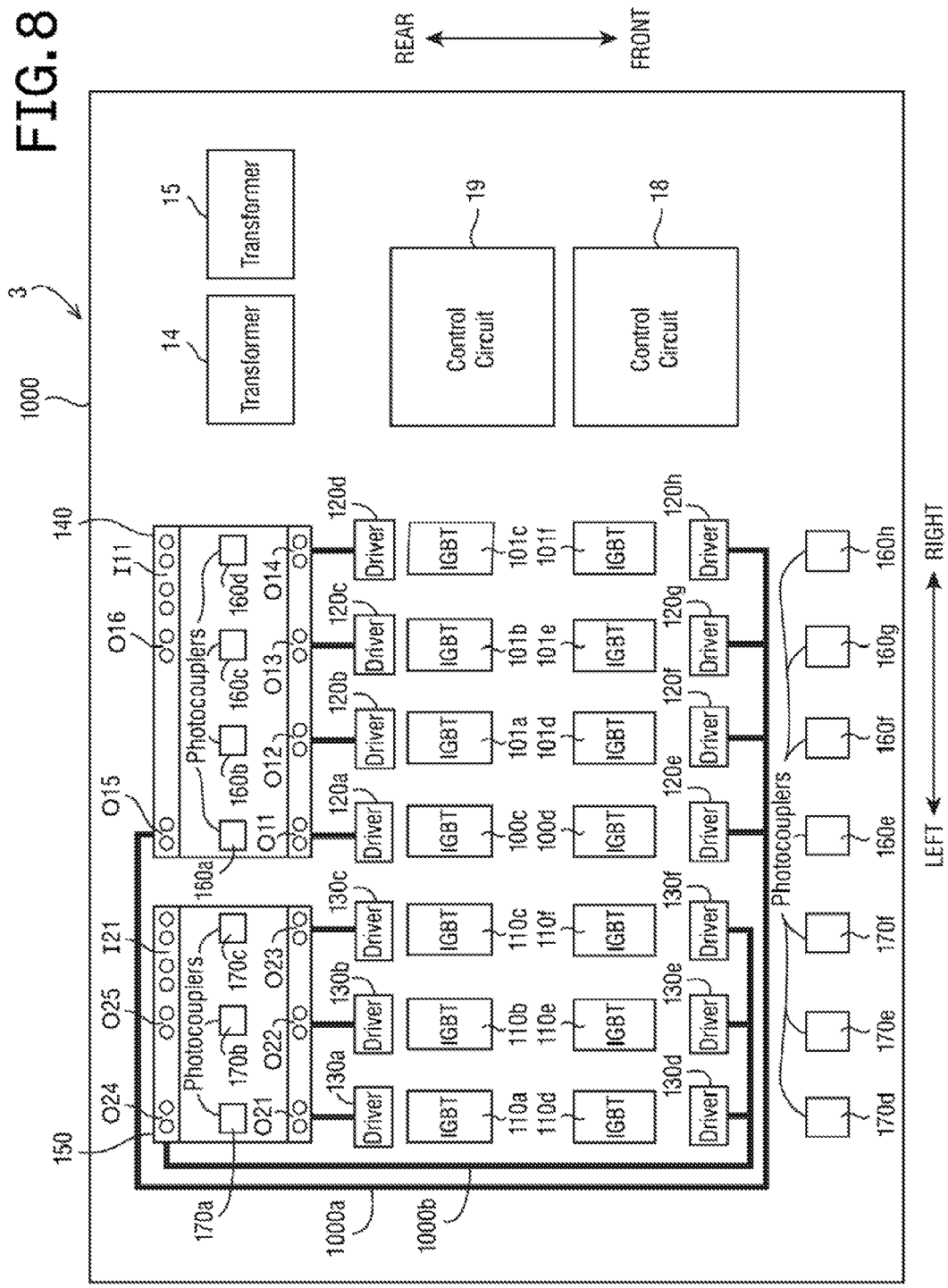

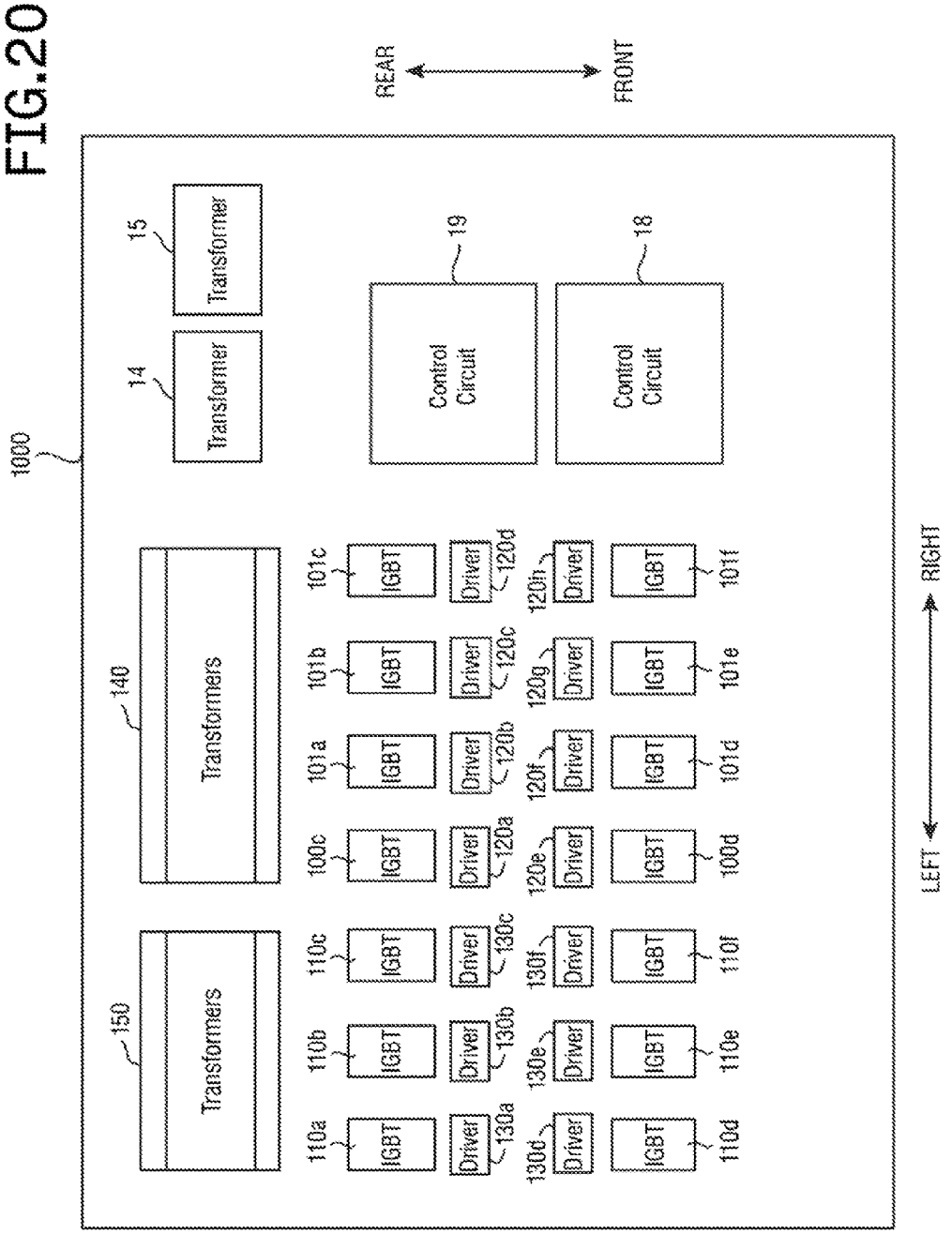

POWER CONVERSION APPARATUS

This application claims priority to Japanese Patent Applications No. 2009-206723 filed on Sep. 8, 2009, and No. 2010-156014 filed on Jul. 8, 2010, the entire contents of which are hereby incorporated by reference.

BACKGROUND OF THE INVENTION

1. Field of the Invention

The present invention relates to a power conversion apparatus including switching elements and transformers for generating voltages used to drive the switching elements.

2. Description of Related Art

As such a power conversion apparatus, there is described an inverter apparatus in Japanese Patent Application Laid-Open No. 2008-118815. This inverter apparatus includes upper arm semiconductor modules, lower arm semiconductor modules, upper arm drivers, lower arm drivers and a transformer. Each of the upper and lower arm semiconductor modules is a switching element constituted of an IGBT and a diode. The upper arm semiconductor modules are mounted in a row on the bottom surface of a wiring board. The lower arm semiconductor modules are mounted in a row on the bottom surface of the wiring board side by side with the row of the upper arm semiconductor modules. Each of the upper arm semiconductor modules is connected in series with a corresponding one of the lower arm semiconductor modules. The series connections each constituted of one of the upper arm semiconductor modules and a corresponding one of the lower arm semiconductor modules are connected in parallel with another.

The upper arm drivers are circuits to respectively drive the upper arm semiconductor modules. The lower arm drivers are circuits to respectively drive the lower arm semiconductor modules. The upper arm drivers are mounted on the top surface of the wiring board so as to be located above the upper arm semiconductor modules. The lower arm drivers are mounted on the top surface of the wiring board so as to be located above the lower arm semiconductor modules. The upper arm drivers are connected to the upper arm semiconductor modules. The lower arm drives are connected to the lower anti semiconductor modules.

The transformer is for supplying a voltage to drive the upper arm semiconductor modules respectively to the upper arm drivers, and supplying a voltage to drive the lower arm semiconductor modules commonly to the lower arm drivers. The transformer is mounted on the top surface of the wiring board so as to be located between the row of the upper semiconductor modules and the row of the lower semiconductor modules. The transformer is connected respectively to the upper arm drivers and the lower arm drivers.

The above inverter apparatus converts DC power inputted thereto to AC power. When the semiconductor modules perform switching operation, switching noise is generated. Also at this time, the semiconductor modules emit heat.

As described in the foregoing, the transformer is located between the row of the upper arm semiconductor modules and the row of the lower arm semiconductor modules. Accordingly, the above inverter apparatus has a problem in that the transformer is susceptible to the switching noise and the heat emitted from the semiconductor modules.

SUMMARY OF THE INVENTION

The present invention provides a power conversion apparatus comprising:

a power conversion circuit including parallel-connected pairs of a high-side switching element and a low-side switching element connected in series;

high-side driver circuits to drive the high-side switching elements;

low-side driver circuits to drive the low-side switching elements; and a transformer to individually supply a first voltage to drive the high-side switching elements to the high-side driver circuits, and commonly supply a second voltage to drive the low-side switching elements to the low-side driver circuits;

wherein the high-side switching elements are mounted in a row along a first direction on a wiring board, the low-side switching elements are mounted in a row along the first direction on the wiring board side by side with the row of the high-side switching elements, and the transformer is mounted on the wiring board on the side of the row of the high-side switching elements opposite to the row of the low-side switching elements.

According to the present invention, there is provided a power conversion apparatus in which effects of the switching noise and heat emitted from the switching elements thereof to the transformer thereof can be reduced.

Other advantages and features of the invention will become apparent from the following description including the drawings and claims.

BRIEF DESCRIPTION OF THE DRAWINGS

In the accompanying drawings:

FIG. 4 is a top view of a wiring board of the motor-generator control apparatus.

FIG. 5 is a top view of a transformer included in one of the power supply circuits;

FIG. 6 is a top view of a transformer included in the other power supply circuit;

FIG. 7 is a top view of a wiring board of a motor-generator control apparatus according to a second embodiment of the invention;

FIG. 8 is a top view of a wiring board of a motor-generator control apparatus according to a third embodiment of the invention;

FIG. 20 is a top view of a wiring board of a still further modification of the motor-generator control apparatus of each of the first to sixth embodiments according to the invention.

PREFERRED EMBODIMENTS OF THE INVENTION

In the following, various embodiments of the invention applied to a motor-generator control apparatus mounted on a vehicle to control a motor-generator are described.

First Embodiment

Figure 1:
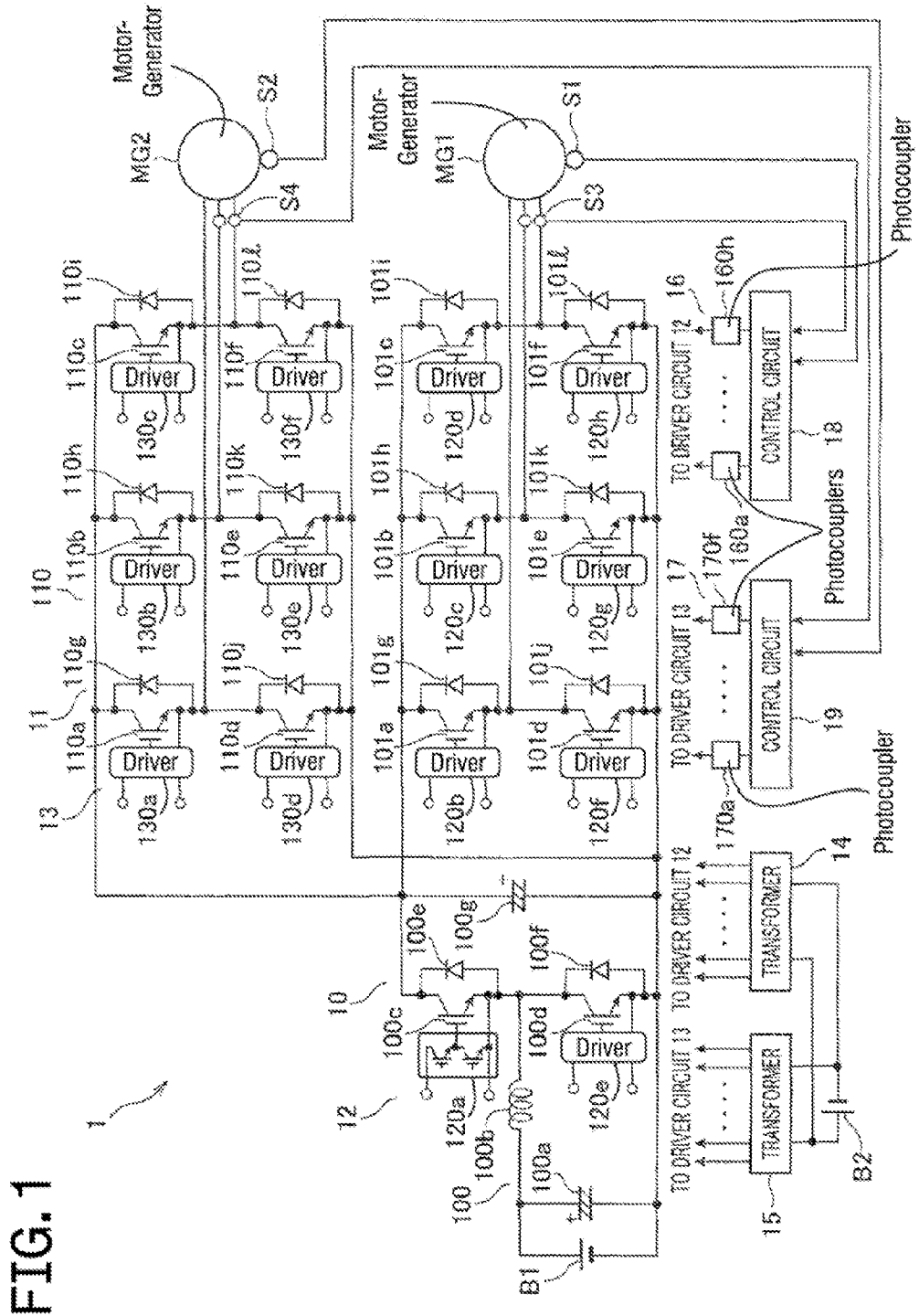
FIG. 1 is a circuit diagram of a motor-generator control apparatus according to a first embodiment of the invention.
Figure 2:
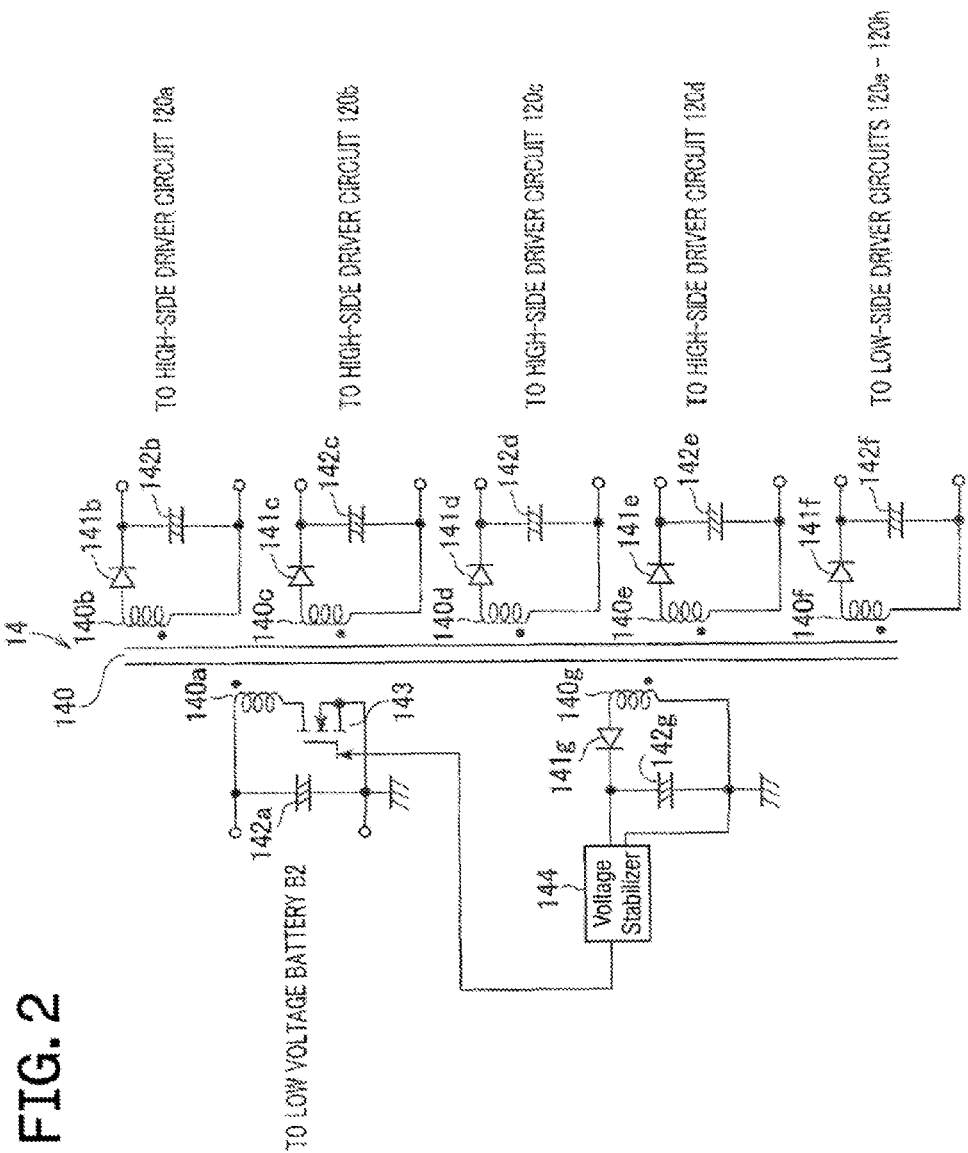
FIG. 2 is a circuit diagram of a power supply circuit to generate a voltage to drive one of power conversion circuits of the motor-generator control apparatus.
Figure 3:
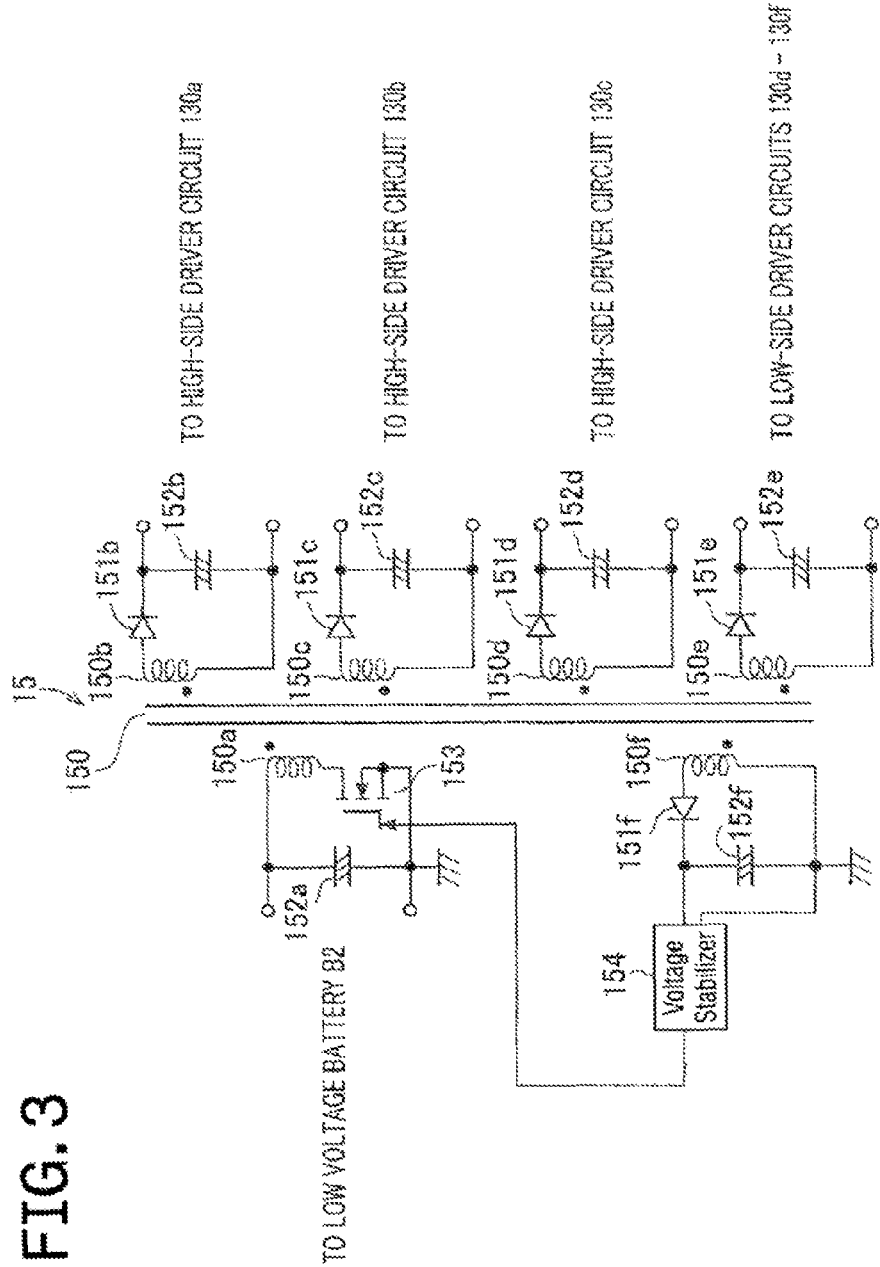
FIG. 3 is a circuit diagram of a power supply circuit to generate a voltage to drive the other power conversion circuit of the motor-generator control apparatus.

First, the structure of a motor-generator control apparatus according to a first embodiment of the invention is explained with reference to FIGS. 1 to 3. FIG. 1 is the circuit diagram of the motor-generator control apparatus according to the first embodiment of the invention. FIG. 2 is the circuit diagram of a power supply circuit to generate a voltage to drive one of power conversion circuits of the motor-generator control apparatus. FIG. 3 is the circuit diagram of a power supply circuit to generate a voltage to drive the other power conversion circuit of the motor-generator control apparatus.

Each of motor-generators MG1 and MG2 shown in FIG. 1 operates as a motor by being supplied with a three-phase AC voltage, and operates as a generator to generate a three-phase AC voltage by being applied with a driving force from the outside. The motor-generators MG1 and MG2 are respectively provided with rotation angle sensor S1 and S2 to measure their rotation angles. The motor-generators MG1 and MG2 are also respectively provided with current sensors S3 and S4 to measure the phase currents respectively flowing through the motor-generators MG1 and MG2.

The motor-generator control apparatus 1 operates to step up a DC voltage of a high voltage battery B1, convert the stepped up DC voltage into a three-phase AC voltage, and supply this three-phase AC voltage to the motor-generators MG1 and MG2 when they operate as motors. The motor-generator control apparatus 1 also operates to convert a three-phase AC voltage generated by each of the motor-generators MG1 and MG2 into a DC voltage, step down the DC voltage, and charge the high-voltage battery B1 by this stepped down DC voltage. That is, the motor-generator control apparatus 1 is an apparatus to convert DC power into AC power and vice versa. The motor-generator control apparatus 1 includes power conversion circuits 10 and 11, drive circuits 12 and 13, power supply circuits 14 and 15, signal transmission circuits 16 and 17, and control circuits 18 and 19.

The power conversion circuit 10 steps up the DC voltage of the high voltage battery B1, converts the stepped up DC voltage into a three-phase AC voltage, and supplies the three-phase AC voltage to the motor generator MG1 when the motor generator MG1 operates as a motor. The power conversion circuit 10 also converts a three-phase AC voltage generated by the motor generator MG1 into a DC voltage, steps down the DC voltage, and charges the high voltage battery B1 by this stepped down DC voltage. The power conversion circuit 10 includes a converter circuit 100 and an inverter circuit 101.

The converter circuit 100 steps up the DC voltage of the high voltage battery B1, and supplies the stepped up DC voltage to the inverter circuit 101 and a later-described inverter circuit 110. The converter circuit 100 also steps down the DC voltage supplied from the inverter circuit 101 and 110, and charges the high voltage battery B1 by this stepped down DC voltage. The converter circuit 100 includes a capacitor 100a, a coil 100b, an IGBT 100c as a high-side switching element, an IGBT 100d as a low-side switching element, diodes 100e and 100f, and a capacitor 100g.

The capacitor 100a is for smoothing the DC voltage. The capacitor 100a smoothes the DC voltage of the high voltage battery B1 during the voltage step-up operation, and smoothes the stepped-down DC voltage to charge the high voltage battery B1 during the voltage step-down operation. The positive terminal and the negative terminal of the capacitor 100a are connected respectively to the positive terminal and the negative terminal of the high voltage battery B1.

The coil 100b accumulates energy therein when a current flows therethrough, and discharges the accumulated energy while inducing a voltage thereacross. One terminal of the coil 100b is connected to the positive terminal of the capacitor 100a, and the other terminal of the coil 100b is connected to the IGBTs 100c and 100d.

The IGBTs 100c and 100d operate as switching elements to cause the coil 100d to accumulate energy and discharge the accumulated energy. The IGBTs 100c and 100d are connected in series to each other. In more detail, the emitter of the IGBT 100c is connected to the collector of the IGBT 100d. The connection node between the IGBTs 100c and 100d is connected to the other terminal of the coil 100b. The collector of the IGBT 100c is connected to the positive terminal of the capacitor 100g, the emitter of the IGBT 100d is connected to the negative terminals of the capacitors 100a and 100g. The gate of the IGBT 100c is connected to a high-side driver circuit 120a (described later), and the gate of the IGBT 100d is connected to a low-side driver circuit 120e (described later).

The diodes 100e and 100f are provided for passing a flywheel current generated as a result of the energy accumulated in the coil 100b being discharged when the IGBT 100c or 100d is turned off. The anodes of the diodes 100e and 100f are connected respectively to the emitters of the IGBT 100c and 100d, and the cathodes of the diodes 100e and 100f are connected respectively to the collectors of the IGBT 100c and 100d.

The capacitor 100g is for smoothing the DC voltage. The capacitor 100g smoothes the stepped-up DC voltage supplied to the inverters 101 and 110 during the voltage step-up operation, and smoothes the DC voltage outputted from the inverters 101 and 110 during the voltage step-down operation. The positive terminal of the capacitor 100g is connected to the collector of the IGBT 100c, and the negative terminal of the capacitor 100g is connected to the emitter of the IGBT 100d.

The positive terminal and the negative terminal of the capacitor 100g are connected respectively to the inverters 101 and 110.

The inverter circuit 101 converts the DC voltage outputted from the converter circuit 100 into a three-phase AC voltage, and supply the three-phase AC voltage to the motor generator MG1 when the motor generator MG1 operates as a motor. The inverter circuit 101 also converts a three-phase AC voltage generated by the motor-generator MG1 into a DC voltage, and supplies this DC voltage to the converter circuit 100 when the motor-generator MG1 operates as a generator. The inverter circuit 101 includes IGBTs 101a to 101c as high-side switching elements, IGBTs 101d to 101f as low-side switching elements, and diodes 101g to 101l.

The IGBTs 101a to 101f are elements for converting a DC voltage into a three-phase AC voltage by being turned on and off. The IGBTs 101a and 101d, IGBTs 101b and 101e, and IGBTs 101c and 101f are respectively connected in series with each other. In more detail, the emitters of the IGBTs 101a to 101c are respectively connected to the collectors of the IGBTs 101d to 101f. The three pairs of the series connections, that is, the series connection of the IGBTs 101a and 101d, the series connection of the IGBTs 101b and 101e, and the series connection of the IGBTs 101c and 101e are connected in parallel with one another. The collectors of the IGBTs 100a to 101c are connected to the positive terminal of the capacitor 100g, the emitters of the IGBTs 101d to 101f are connected to the negative terminals of the capacitor 100g. Accordingly, the four pairs of the series connection, that is, the series connection of the IGBTs 100c and 100d, the series connection of the IGBTs 101a and 101d, the series connection of the IGBTs 101b and 101e, and the series connection of the IGBTs 101c and 101f are connected in parallel with one another. The gates of the IGBTs 101a to 101c are respectively connected to later-described high-side driver circuits 120b to 120d, and the gates of the IGBTs 101d to 101f are respectively connected to later-described low-side driver circuit 120f to 120h. The connection nodes between the IGBTs 101a and 101d, between the IGBTs 101b and 101e, and between the IGBTs 101c and 101f are respectively connected to the motor-generator MG1

Each of the diodes 101g to 101l passes a flywheel current generated when the corresponding IGBT is turned off, and the energy accumulated in the corresponding coil of the motor-generator MG1 is discharged. Each of the diodes 101g to 101l also serves as an element for converting the three-phase AC voltage generated by the motor-generator MG1 into a DC voltage. The anodes of the diodes 101g to 101l are connected respectively to the emitters of the IGBT 101a to 101f, and the cathodes of the diodes 101g to 101l are connected respectively to the collectors of the IGBT 101a to 101f.

The power conversion circuit 11 converts the DC voltage outputted from the converter circuit 100 into a three-phase AC voltage, and supplies this three-phase AC voltage to the motor-generator MG2 when the motor generator MG2 operates as a motor. The power conversion circuit 11 also converts a three-phase AC voltage generated by the motor-generator MG2 into a DC voltage, and supplies this DC voltage to the converter circuit 100 when the motor-generator MG2 operates as a generator. The power conversion circuit 11 includes an inverter circuit 110. The inverter circuit 110 includes IGBTs 110a to 110c as high-side switching elements, IGBTs 110d to 110f as low-side switching elements, and diodes 110g to 110l. The inverter circuit 110 has the same structure as that of the inverter circuit 101. The collectors of the IGBTs 110a to 110c are connected to the positive terminal of the capacitor 100g, the emitters of the IGBTs 110d to 110f are connected to the negative terminal of the capacitor 100g. The gates of the IGBTs 110a to 110c are respectively connected to later-described high-side driver circuits 130a to 130c, and the gates of the IGBTs 110d to 110f are respectively connected to later-described low-side driver circuits 130d to 130f. The connection nodes between the IGBTs 110a and 110d, between the IGBTs 110b and 110e, and between the IGBTs 110c and 110f are respectively connected to the motor-generator MG2.

The drive circuit 12 is supplied with a voltage used to drive the IGBTs from the power supply circuit 14, and turns on and off the IGBTs 100c, 100d, and 101a to 101f in accordance with a drive signal received from the control circuit 18 through the signal transmission line 16. The driver circuit 12 includes high-side driver circuits 120a to 120d, and low-side driver circuits 120e to 120h.

The high-side driver circuits 120a to 120d are provided to respectively turn and off the high-side IGBTs 100c and 101a to 101c. The high-side driver circuits 120a to 120d are connected to the power supply circuit 14 at their voltage input terminals, connected to the signal transmission line 16 at their drive signal input terminals, and respectively connected to the emitters and gates of the IGBTs 100c and 101a to 101c at their output terminals. The low-side driver circuits 120e to 120h are provided to respectively turn and off the low-side IGBTs 100d and 101d to 101f. The low-side driver circuits 120e to 120h are connected to the power supply circuit 14 at their voltage input terminals, connected to the signal transmission line 16 at their drive signal input terminals, and respectively connected to the emitters and gates of the IGBTs 100d and 101d to 101f at their output terminals.

The drive circuit 13 is supplied with a voltage used to drive the IGBTs from the power supply circuit 15, and turns on and off the IGBTs 110a to 110f in accordance with a drive signal received from the control circuit 19 through the signal transmission line 17. The drive circuit 13 includes high-side driver circuits 130a to 130c, and low-side driver circuits 130d to 130f.

The high-side driver circuits 130a to 130c turns on and off the high-side IGBTs 110a to 110c. The high-side driver circuits 130a to 130c are connected to the power supply circuit 15 at their voltage input terminals, connected to the signal transmission line 17 at their drive signal input terminals, and respectively connected to the emitters and gates of the IGBTs 110a to 110c at their output terminals. The low-side driver circuits 130d to 130f turns on and off the low-side IGBTs 110d to 110f. The low-side driver circuits 130d to 130f are connected to the power supply circuit 15 at their voltage input terminals, connected to the signal transmission line 17 at their drive signal input terminals, and respectively connected to the emitters and gates of the IGBTs 110d to 110f at their output terminals.

The power supply circuit 14 supplies a voltage used to drive the IGBTs 100c, 100d, and 101a to 101f to the drive circuit 12. As shown in FIG. 2, the power supply circuit 14 includes a transformer 140, diodes 141b to 141g, capacitors 142a to 142g, a MOSFET 143 and an output voltage stabilizing circuit 144.

The transformer 140 includes a primary coil 140a and secondary coils 140b to 140g. The secondary coils 140b to 140e respectively output the voltage used to drive the high-side IGBTs 100c and 101a to 101c. The secondary coil 140f outputs the voltage used to drive the low-side IGBTs 100d and 101d to 101f. The secondary coil 140g is for measuring the output voltage of the transformer 140.

One end of the capacitor 142a is connected to one end of the primary coil 140a. The drain of the MOSFET 143 is connected to the other end of the primary coil 140a. The other end of the capacitor 142a is grounded and connected to the source of the MOSFET 143. The anodes of the diodes 141b to 141f are respectively connected to the one ends of the secondary coils 140b to 140f. One ends of the capacitors 142b to 142f are respectively connected to the cathodes of the diodes 141b to 141f the one end and the other end of the primary coil 140a. The other ends of the capacitors 142b to 142f are respectively connected to the other ends of the secondary coils 140b to 140f. The anode of the diode 141g is connected to one end of the secondary coil 140g. One end of the capacitor 142g is connected to the cathode of the diode 141g. The other end of the capacitor 142g is grounded and connected to the other end of the secondary coil 140g. The output voltage stabilizing circuit 144 is connected to the both ends of the capacitor 142g at its input terminals, and to the gate of the MOSFET 143 at its output terminal.

The both ends of the capacitor 142a as the input terminals of the power supply circuit 14 are connected to a low-voltage battery B2. The both ends of each of the capacitors 142b to 142e as the output terminals of the power supply circuit 14 are respectively connected to the high-side driver circuits 120a to 120d. The both ends of the capacitor 142f as the output terminals of the power supply circuits 14 are commonly connected to the low-side driver circuits 120e to 120h.

The power supply circuit 15 supplies the voltage used to drive the IGBTs 110a to 110f to the drive circuit 13. As shown in FIG. 3, the power supply circuit 15 includes a transformer 150, diodes 151b to 151f, capacitors 152a to 142f, a MOSFET 153 and an output voltage stabilizing circuit 154.

The transformer 150 includes a primary coil 150a, and secondary coils 150b to 150f. The secondary coils 150b to 150d outputs the voltage used to drive the high-side IGBTs 110a to 110c. The secondary coil 150e outputs the voltage used to drive the low-side IGBTs 110d to 110f. The secondary coil 150f is for measuring the output voltage of the transformer 150.

One end of the capacitor 152a is connected to one end of the primary coil 150a. The drain of the MOSFET 153 is connected to the other end of the primary coil 150a. The other end of the capacitor 152a is grounded and connected to the source of the MOSFET 153. The anodes of the diodes 151b to 151e are respectively connected to one ends of the secondary coils 150b to 150e. One end of each of the capacitors 152b to 152e is respectively connected to the cathodes of the diodes 151b to 151e. The other ends of the capacitors 152b to 152e are respectively connected to the other ends of the primary coils 150b to 150e. The anode of the diode 151f is connected to one end of the secondary coil 150f. One end of the capacitor 152f is connected to the cathode of the diode 151f. The other end of the capacitor 152f is grounded and connected to the other end of the secondary coil 150f. The output voltage stabilizing circuit 154 is connected to the both ends of the capacitor 152f at its input terminals and to the gate of the MOSFET 153 at its output terminal.

Both ends of the capacitor 152a as the input terminals of the power supply circuit 15 are connected to the low-voltage battery B2. The both ends of each of the capacitors 152b to 152d as the output terminals of the power supply circuit 15 are respectively connected to the high-side driver circuits 130a to 130c. The both ends of the capacitor 152e as the output terminals of the power supply circuits 15 are commonly connected to the low-side driver circuit 130d to 130f.

The signal transmission circuit 16 is for transmitting the drive signal outputted from the control circuit 18 to the IGBTs 100c, 100d and 101a to 101f in the state of the drive signal being electrically insulated. The signal transmission line 16 includes high-side photocouplers 160a to 160d, and low-side photocouplers 160e to 160h.

The high-side photocouplers 160a to 160d transmit the drive signal respectively to the high-side driver circuits 120a to 120d. The drive signal input terminals of the high-side photocouplers 160a to 160d are connected to the control circuit 18. The drive signal output terminals of the high-side photocouplers 160a to 160d are respectively connected to the drive signal input terminals of the high-side driver circuits 120a to 120d. The low-side photocouplers 160e to 160h transmit the drive signal to the low-side driver circuits 120e to 120h. The drive signal input terminals of the low-side photocouplers 160e to 160h are connected to the control circuit 18. The drive signal output terminals of the low-side photocouplers 160e to 160h are respectively connected to the drive signal input terminals of the low-side driver circuits 120e to 120h.

The signal transmission circuit 17 is for transmitting the drive signal outputted from the control circuit 19 to the IGBTs 110a to 110f in the state of the drive signal being electrically insulated. The signal transmission line 17 includes high-side photocouplers 170a to 170c, and low-side photocouplers 170e to 170f.

The high-side photocouplers 170a to 170c transmit the drive signal to the high-side driver circuits 130a to 130c. The drive signal input terminals of the high-side photocouplers 170a to 170c are connected to the control circuit 19. The drive signal output terminals of the high-side photocouplers 170a to 170c are respectively connected to the drive signal input terminals of the high-side driver circuits 130a to 130c. The low-side photocouplers 170d to 170f transmit the drive signal to the low-side driver circuits 130d to 130f. The drive signal input terminals of the low-side photocouplers 170d to 170f are connected to the control circuit 19. The drive signal output terminals of the low-side photocouplers 170d to 170f are respectively connected to the drive signal input terminals of the low-side driver circuits 130d to 130f.

The control circuit 18 turns on and off the IGBT 100d for the converter circuit 100 to perform the voltage step-up operation, and turns on and off the IGBTs 101a to 101f for the inverter circuit 101 to convert the DC voltage into the three-phase AC voltage when the motor-generator MG1 operates as a motor. The control circuit 18 also turns on and off the IGBT 100c for the converter circuit 100 to perform the voltage step-down operation when the motor generator MG1 and MG2 operate as generators. The control circuit 18 includes a microcomputer which generates the drive signal to turn on and off the IGBTs 100c, 100d and 101a to 101f in accordance with the measurement results by the rotation angle sensor S1 and the current sensor S3. The input terminal of the control circuit 18 is connected to the output terminals of the rotation angle sensor S1 and the current sensor S3. The drive signal output terminal of the control circuit 18 is connected to the drive signal input terminals of the high-side photocouplers 160a to 160d and the low-side photocouplers 160e to 160h.

The control circuit 19 turns on and off the IGBTs 110a to 110f for the inverter circuit 110 to convert the DC voltage outputted from the converter circuit 100 into the three-phase AC voltage when the motor-generator MG2 operates as a motor. The control circuit 19 includes a microcomputer which generates the drive signal to turn on and off the IGBTs 110a to 110f in accordance with the measurement results by the rotation angle sensor 82 and the current sensor S4. The input terminal of the control circuit 19 is connected to the output terminals of the rotation angle sensor 82 and the current sensor S4. The drive signal output terminals of the control circuit 19 are connected to the drive signal input terminals of the high-side photocouplers 170a to 170c and the low-side photocouplers 170d to 170f.

Next, the layout of the major components of the motor-generator control apparatus 1 is explained. FIG. 4 is a top view of a wiring board having a rectangular shape of the motor-generator control apparatus 1. In FIG. 4, the wirings patterns each constituted of positive and negative wires and extending from the transformer 140 or 150 to a corresponding one of the driver circuits are shown by heavy lines. FIG. 5 is a top view of the transformer 140. FIG. 6 is a top view of the transformer 150. In FIGS. 5 and 6, the primary coils and secondary coils are shown by thin lines. The descriptions "FRONT-REAR DIRECTION" and "LEFT-RIGHT DIRECTION" in the drawings are just for explanation purposes.

As shown in FIG. 4, the high-side IGBTs 100c, 101a to 101c and 110a to 110c are mounted in a row in the left-right direction on the bottom surface of the wiring board 1000. The low-side IGBTs 100d, 101d to 101f and 110d to 110f are mounted in a row on the bottom surface of the wiring board 1000 in the left-right direction so as to be located in the front of the row of the high-side IGBTs. In this embodiment, the left-right direction corresponds to the row direction, and the front-rear direction corresponds to the direction crossing the row direction.

The transformer 140 is mounted on the top surface of the wiring board 1000 so as to be located in the rear of the row of the high-side IGBTs 100c and 101a to 101c (that is, on the opposite side of the low-side IGBTs). The transformer 150 is mounted on the top surface of the wiring board 1000 so as to be located rearward of the row of the high-side IGBTs 110a to 110c (that is, on the opposite side of the low-side IGBTs).

As shown in FIG. 5, the transformer 140 includes, at its front end, output terminals O11 to O14 formed in this order from left to right of the secondary coils 140a to 140e to output the voltage to drive the high-side IGBTs 100c and 101a to 101c. The transformer 140 also includes, at its rear end, an input terminal I11 of the primary coil 140a, an output terminal O16 of the secondary coil 140g to measure the output voltage of the transformer 140, and an output terminal O15 to output the voltage to drive the low-side IGBTs 100d and 101d to 101f. The input terminal I11 of the primary coil 140a is formed in the left side end, and the output terminal O15 of the secondary coil 140f is formed in the right side end.

As shown in FIG. 6, the transformer 150 includes, at its front end, output terminals O21 to 23 formed in this order from left to right of the secondary coils 150b to 150d to output the voltage to drive the high-side IGBTs 110a to 110c. The transformer 150 also includes, at its rear end, an output terminal O24 of the primary coil 150e to output the voltage to drive the low-side IGBTs 110d to 110f, an output terminal O25 of the secondary coil 150f to measure the output voltage of the transformer 150, and an input terminal I21 of the primary coil 150a. The input terminal I21 of the primary coil 150a is formed in the right side end, and the output terminal O24 of the secondary coil 150e is formed in the left side end.

As shown in FIG. 4, the power supply circuits 14 and 15 excluding the transformers 140 and 150 are mounted on the right side of the transformer 140 in this order from left to right.

The high-side driver circuits 120a to 120d are mounted in a row on the top surface of the wiring board 1000 side by side with the row of the high-side IGBTs 100c and 101a to 101c between the row of the high-side IGBTs 100c and 101a to 101c and the transformer 140. The wiring patterns to individually supply the voltages from the output terminals O11 to O14 of the transformer 140 to the high-side driver circuits 120a to 120d extend in the front-rear direction from the transformer 140 to the high-side driver circuits 120a to 120d.

The low-side driver circuits 120e to 120h are mounted on the top surface of the wiring board 1000 so as to be located in the front of the row of the low-side IGBTs 100d and 101d to 10fc (that is, on the opposite side of the high-side switching elements). The wiring pattern 1000a to commonly supply the voltage from the output terminal O15 of the transformer 140 to the low-side driver circuits 120e to 120h is formed on the top surface of the wiring board 1000 so as to extend in the front-rear direction on the right side of the row of the high-side IGBTs 100c and 101a to 101c and the row of the low-side IGBTs 100d and 101d to 101f, and extend in the left-right direction in the front of the row of the low-side driver circuits 120e to 120h (that is, on the opposite side of the row of the high-side IGBTs).

The high-side driver circuits 130a to 130c are mounted in a row on the top surface of the wiring board 1000 side by side with the high-side IGBTs 110a to 110c between the row of the high-side IGBTs 110a to 110c and the transformer 150. The wiring patterns to supply the voltages from the output terminals O21 to O23 of the transformer 150 to the high-side driver circuits 130a to 130c extend in the front-rear direction from the transformer 150 to the high-side driver circuits 130a to 130c.

The low-side driver circuits 130d to 130f are mounted in a row on the top surface of the wiring board 1000 in the front of and side by side with the row of the low-side IGBTs 110d to 110f (that is, on the opposite side of the row of the high-side IGBTs). The wiring pattern 1000b to commonly supply the voltage from the output terminal O24 of the transformer 150 to the low-side driver circuits 130d to 130f is formed on the top surface of the wiring board 1000 so as to extend in the front-rear direction on the left side of the row of the high-side IGBTs 110a and 110c and the row of the low-side IGBTs 110d to 110f, and extend in the left-right direction in the front of the row of the low-side driver circuits 130d to 130f (that is, on the opposite side of the row of the high-side IGBTs).

The high-side photocouplers 160a to 160d are mounted in a row on the bottom surface of the wiring board 1000 so as to be located opposite to the transformer 140. The low-side photocouplers 160e to 160h are mounted in a row on the bottom surface of the wiring board 1000 so as to be located in the front of and side by side with the row of the low-side IGBTs 120e to 120h (that is, on the opposite side of the high-side IGBTs).

The high-side photocouplers 170a to 170c are mounted in a row on the bottom surface of the wiring board 1000 so as to be located opposite to the transformer 150. The low-side photocouplers 170d to 170f are mounted in a row on the bottom surface of the wiring board 1000 so as to be located in the front of and side by side with the row of the low-side IGBTs 130d to 130f (that is, on the opposite side of the high-side IGBTs).

The control circuit 18 is mounted on the top surface of the wiring board 1000 on the right side of the row of the high-side IGBTs 100c, 101a to 101d and 110a to 110c. The control circuit 19 is mounted on the top surface of the wiring board 1000 on the right side of the row of the low-side IGBTs 100d and 101d to 101f and 110d to 110f.

Next, the operation of the motor-generator control apparatus 1 having the above described structure is explained with reference to FIGS. 1 to 3. Referring to FIG. 1, the power supply circuits 14 and 15 generate the voltage to drive the IGBTs 100c, 100d, 101a to 101f and 110a to 110f. Referring to FIG. 2, the output voltage stabilizing circuit 144 of the power supply circuit 14 turns on and off the MOSFET 143 to convert the DC voltage of the low voltage battery B2 into an AC voltage to be applied to the primary coil 140a of the transformer 140. When the primary coil 140a is applied with the AC voltage, AC voltages are outputted respectively from the secondary coils 140b to 140g, these AC voltages having values depending on the turn numbers of the respective secondary coils 140b to 140g. The AC voltages outputted from the secondary coils 140b to 140g are respectively converted into DC voltages by being rectified by the diodes 141b to 141g and the capacitors 142b to 142g. The output voltage stabilizing circuit 144 adjusts the timings to turn on and off the MOSFET 143 in order that the DC voltage rectified by the diode 141g and the capacitor 142g is kept at a predetermined voltage. As a result, each of the driver circuits is supplied with the stabilized DC voltage. The above explanation also applies to the power supply circuit 15 shown in FIG. 3.

Referring to FIG. 1, when the motor-generators MG1 and MG2 operate as motors, the control circuit 18 turns on the IGBT 100d to cause the coil 100b to accumulate energy from the high voltage battery B1. Subsequently, the control circuit 18 turns off the IGBT 100d to discharge the energy stored in the coil 100b. At this time, the voltage at one end of the coil 100b connected to the IGBTs 100c and 100d becomes higher than the voltage at the other end of the coil 100b connected to the capacitor 100a. That is, the voltage of the one end of the coil 100b becomes higher than the voltage of the high voltage battery B1. At this time, since the IGBTs 100c and 100d are both off, the current as a result of the discharge of the energy from the coil 100b flows into the capacitor 100g through the diode 100e to charge the capacitor 100g. The control circuit 18 turns on and off the IGBT 100d repeatedly in order that the voltage of the capacitor 100g is kept at a predetermined voltage.

The control circuits 18 and 19 also turn on and off the IGBTs 101a to 101f and 110a to 110f at timings in accordance with the measurement results by the rotation angle sensors S1 and 82 and the current sensors S3 and S4 in order to convert the voltage charged in the capacitor 100g into the three-phase AC voltage to be supplied to the motor-generators MG1 and MG2. The motor-generators MG1 and MG2 operate as motors to generate torque when supplied with the three-phase AC voltage from the inverter circuits 101 and 102.

On the other hand, when the motor-generators MG1 and MG2 operate as generators, the inverter circuits 101 and 110 convert the three-phase AC voltages generated by the motor-generator MG1 and MG2 into a DC voltage. The capacitor 100g is charged by this DC voltage.

The control circuit 18 turns on the IGBT 100c to cause the coil 100b to accumulate energy from the capacitor 100g. Subsequently, the control circuit 18 turns off the IGBT 100c to cause the coil 100b to discharge the energy accumulated therein. At this time, the voltage at the one end of the coil 100b connected to the capacitor 100a becomes higher than the voltage at the other end of the coil 100b connected to the IGBTs 100c and 100d. That is, the voltage at the one end of the coil 100b becomes lower than the voltage of the voltage of the capacitor 100g. At this time, since the IGBTs 100c and 100d are both off, the current as a result of the discharge of the energy from the coil 100b flows into the high voltage battery B1 through the diode 100f to charge the high voltage battery B1. The control circuit 18 turns on and off the IGBT 100c repeatedly in order that the voltage of the high voltage battery B1 is kept at a predetermined voltage.

The first embodiment described above provides the following advantages.

In the first embodiment, the transformers 140 and 150 are mounted rearward of the row of the high-side IGBTs 100c, 101a to 101c and 110a to 110c (that is, on the opposite of the low-side IGBTs). This makes it possible to reduce the effects of the switching noise and the heat emitted from the IGBTs to the transformers 140 and 150 compared to the conventional structures in which the transformers are mounted between the row of the high-side IGBTs and the row of the low-side IGBTs.

In the first embodiment, the high-side driver circuits 120a to 120d and 130a to 130c are mounted in a row side by side with the high-side IGBTs 100c, 101a to 101c and 110a to 110c between the row of the high-side IGBTs 100c, 101a to 101c and 110a to 110c, and the transformers 140 and 150. This makes it possible to reduce the lengths of the wiring patterns respectively extending from the transformer 140 or 150 to the high-side driver circuits 120a to 120d or 130a to 130c, and the lengths of the wiring patterns each extending from one of the high-side driver circuits 120a to 120d or 130a to 130c to a corresponding one of the high-side IGBTs 100c, 101a to 101c and 110a to 110c. As a result, since the impedances of the wiring patterns can be reduced, it is possible to suppress the voltage variations without using specific capacitors for stabilizing the voltages. Further, it is also possible to reduce the effects of the switching noise and the heat emitted from the IGBTs to the high-side driver circuits 120a to 120d and 130a to 130c compared to conventional structures in which the high-side driver circuits are mounted between the row of the high-side IGBTs and the row of the low-side IGBTs.

In the first embodiment, the voltage output terminals O11 to O14 and O21 to O23 for the high-side IGBTs are formed in the front end portion of the transformer 140 or 150, that is in the portion facing the high-side driver circuits. This makes it possible to further reduce the lengths of the wiring patterns each extending from the transformer 140 or 150 to one of the high-side driver circuits 120a to 120d and 130a to 130c.

In the first embodiment, the low-side driver circuits 120a to 120h and 130d to 130f are mounted in a row in the front of and side by side with the row of the low-side IGBTs 100d, 101d to 101f and 110d to 110f (that is, on the opposite side of the row of the high-side IGBTs). This makes it possible to reduce the effects of the switching noise and the heat emitted from the IGBTs to the low-side driver circuits 120e to 120h and 130d to 130f compared to the conventional structures in which the low-side driver circuits are mounted between the row of the high-side IGBTs and the row of the low-side IGBTs.

In the first embodiment, the wiring pattern 1000a to commonly supply the voltage from the transformer 140 to the low-side driver circuits 120e to 120h is formed so as to extend in the front-rear direction on the right side of the row of the high-side IGBTs 100c and 101a to 101c and the row of the low-side IGBTs 100d and 101d to 101f, and extend in the left-right direction in the front of the row of the low-side driver circuits 120e to 120h (that is, on the opposite side of the row of the high-side IGBTs). Further, the wiring pattern 1000b to commonly supply the voltage from the transformer 150 to the low-side driver circuits 130d to 130f is formed so as to extend in the front-rear direction on the left side of the row of the high-side IGBTs 110a and 110c and the row of the low-side IGBTs 110d to 110f, and extend in the left-right direction in the front of the row of the low-side IGBTs 130d to 130f (that is, on the opposite side of the row of the high-side IGBTs). This makes it possible to reduce the effects of the switching noise and the heat emitted from the IGBTs to the wiring patterns 1000a and 1000b extending from the transformer 140 or 150 to the low-side driver circuits 120e to 120h or 130d to 130f.

In the first embodiment, the voltage output terminals O15 for the low-side IGBTs is formed in the right end portion of the transformer 140, and the voltage output terminals O24 for the low-side IGBTs is formed in the left end portion of the transformer 150. This makes it possible to efficiently lay out the wiring patterns 1000a and 1000b between the transformer 140 or 150 and the low-side driver circuits 120e to 120h or 130d to 130f.

In the first embodiment, the high-side photocouplers 160a to 160d and 170a to 170c are mounted on the bottom surface of the wiring board 1000 so as to be located opposite to the transformer 140 or 150. This makes it possible to use the portion of the wiring board 1000 opposite to the transformer 140 or 150 to thereby efficiently mount the high-side photocouplers 160a to 160d and 170a to 170c, as a result of which the wiring board 1000 can be made compact in size.

In the first embodiment, the low-side photocouplers 160e to 160h and 170d to 170f are mounted in a row on the bottom surface of the wiring board 1000 so as to be located in the front of and side by side with the row of the low-side IGBTs 120e to 120h and 130d to 130f (that is, on the opposite side of the high-side IGBTs). This makes it possible to reduce the effects of the switching noise and the heat emitted from the IGBTs to the low-side photocouplers 160e to 160h and 170d to 170f compared to the conventional structures in which the low-side photocouplers are mounted between the row of the high-side IGBTs and the row of the low-side IGBTs.

The first embodiment describes an example in which the wiring patterns 1000a and 1000b are formed adjacent to the row of the high-side IGBTs 100c and 101a to 101c, or 110a to 110c and the row of the low-side IGBTs 100d and 101d to 101f or 110d to 110f so as to extend in the direction crossing these rows, and extend in the direction parallel to the row of the low-side IGBTs 100d, 101d to 101f and 110d to 110f on the opposite side of the high-side IGBTs. However, the layout of the wiring patterns 1000a and 1000 is not limited thereto.

Figure 11:
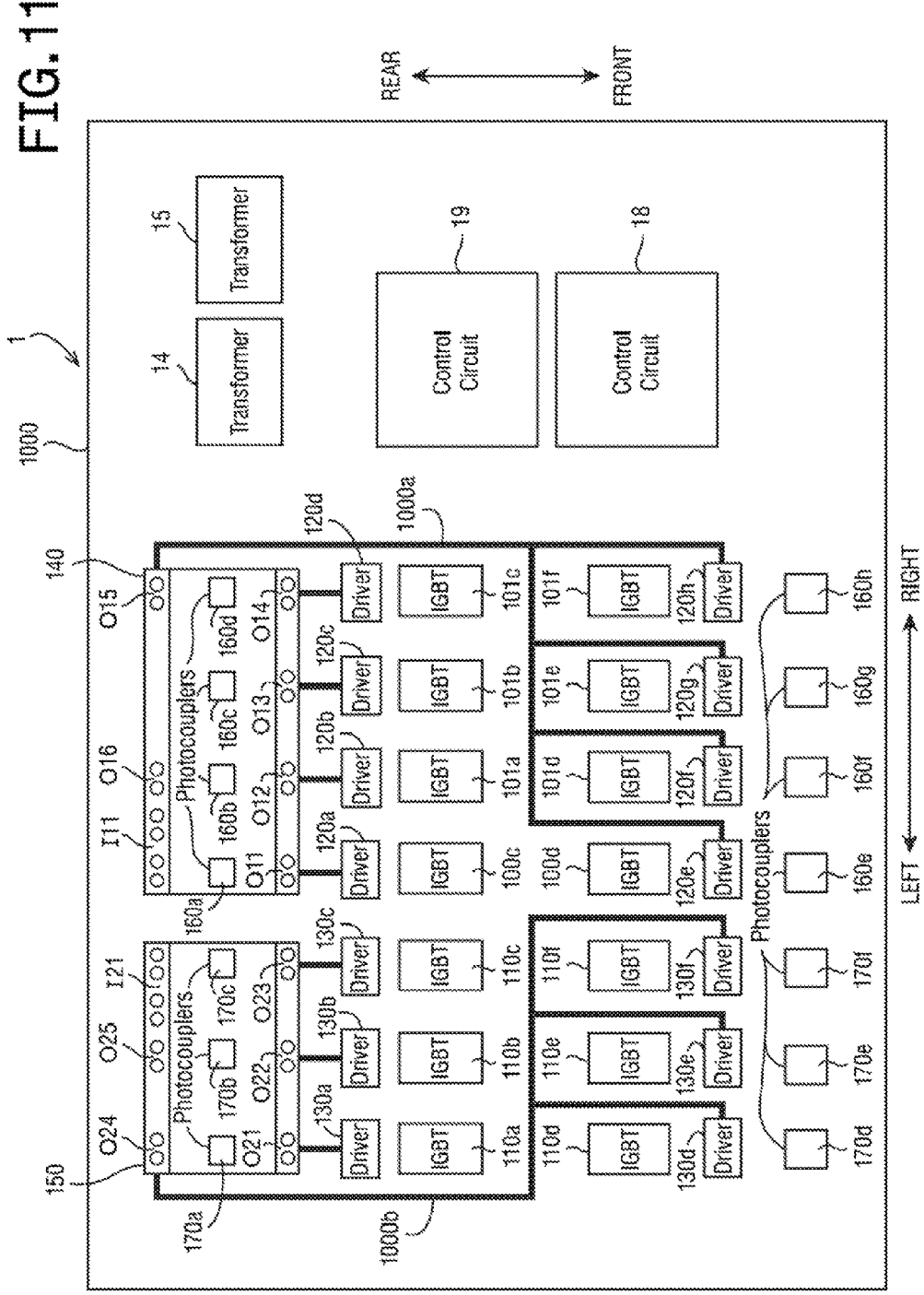
FIG. 11 is a top view of a wiring board of a modification of the motor-generator control apparatus according to the first embodiment of the invention.

For example, as shown in FIG. 11, the wiring patterns 1000a and 1000b may be formed adjacent to the row of the high-side IGBTs 100c, 101a to 101c and 110a to 110c and the row of the low-side IGBTs 100d, 101d to 101f and 110d to 110f so as to extend in the direction crossing these rows, and extend in the space between the row of the high-side IGBTs 100c, 101a to 101c and 110a to 110c and the row of low-side IGBTs 100d, 101d to 101f and 110d to 110f in the direction parallel to these rows.

Second Embodiment

Next, a motor-generator control apparatus 2 according to a second embodiment of the invention is described. The second embodiment differs from the first embodiment in the layout of the low-side driver circuits and the associated wiring patterns.

First, the layout of the major components and the wiring patterns of the motor-generator control apparatus 2 is explained with reference to FIG. 7. FIG. 7 is a top view of a wiring board of the motor-generator control apparatus 2. In FIG. 7, the wirings patterns each constituted of positive and negative wires and extending from the transformer 140 or 150 to a corresponding one of the respective driver circuits are shown by heavy lines. The descriptions "FRONT-REAR DIRECTION" and "LEFT-RIGHT DIRECTION" are just for explanation purposes. The following description of the second embodiment focuses on the differences with the first embodiment, that is, on layout of the major components and the wiring patterns.

The circuit structure of the motor-generator control apparatus 2 of the second embodiment is the same as that of the motor-generator control apparatus 1 of the first embodiment. As shown in FIG. 7, the layout of the high-side IGBTs 100c, 101a to 101c and 110a to 110c, the low-side IGBTs 100d, 101d to 101f and 110d to 110f, the transformers 140 and 150, the power supply circuits 14 and 15, the high-side driver circuits 120a to 120d and 130a to 130c, the high-side photocouplers 160a to 160d and 170a to 170c, and the control circuits 18 and 19 of the motor-generator control apparatus 2 is the same as that of the motor-generator control apparatus 1 of the first embodiment.

The low-side driver circuits 120e to 120h are mounted in a row on the top surface of the wiring board 1000 side by side with the row of the low-side IGBTs 100d and 101d to 101f between the row of the high-side IGBTs 100c, and 101a to 101c, and the row of the low-side IGBTs 100d and 101d to 101f. The wiring pattern 1000a to commonly supply the voltage to the low-side driver circuits 120e to 120h is formed on the top surface of the wiring board 1000 so as to extend in the front-rear direction on the right side of the row of the high-side IGBTs 100c and 101a to 101c and the row of the low-side IGBTs 100d and 101d to 101f, and extend in the left-right direction between the row of the high-side IGBTs and the row of the low-side driver circuits 120e to 120h.

The low-side driver circuits 130a to 130f are mounted in a row on the top surface of the wiring board 1000 side by side with the row of the low-side IGBTs 110d to 110f between the high-side IGBTs 110a to 110c and the row of the low-side IGBTs 110d to 110f. The wiring pattern 1000b is formed on the top surface of the wiring board 1000 so as to extend in the front-rear direction on the left side of the row of the high-side IGBTs 110a to 110c and the row of the low-side IGBTs lid to 110f, and extend in the left-right direction between the row of the high-side IGBTs 110a to 110c and the row of the low-side driver circuits 130d to 130f.

The second embodiment described above provides the following advantages. In the second embodiment, the low-side driver circuits 120e to 120h and 130d to 130f are mounted in a row between the row of the high-side IGBTs 100c, 101a to 101d and 110a to 110c and the row of the low-side IGBTs 100d, 101d to 101f and 110d to 110f. This makes it possible to use the space between the row of the high-side IGBTs and the row of the low-side IGBT to efficiently mount the low-side driver circuits 120e to 120h and 130d to 130f, as a result of which the wiring board 1000 can be made compact in size.

In the second embodiment, the wiring pattern 1000a is formed on the top surface of the wiring board 1000 so as to extend in the front-rear direction on the right side of the row of the high-side IGBTs 100c and 101a to 101c and the row of the low-side IGBTs 100d and 101d to 101f, and extend in the left-right direction between the row of the high-side IGBTs 100c and 101a to 101c and the row of the low-side driver circuits 120e to 120h. On the other hand, the wiring pattern 1000b is formed on the top surface of the wiring board 1000 so as to extend in the front-rear direction on the left side of the row of the high-side IGBTs 110a to 110c and the row of the low-side IGBTs 110d to 110f, and extend in the left-right direction between the row of the high-side IGBTs 110a to 110c and the row of the low-side driver circuits 130d to 130f. This makes it possible to efficiently mount the wiring patterns 1000a and 1000b extending from the transformer 140 or 150 to the low-side driver circuits 120e to 120h or 130d to 130f, while reducing the effects of the switching noise and the heat emitted from the IGBTs to the wiring patterns 1000a and 1000b.

In the second embodiment, the wiring patterns 1000a and 1000b are formed adjacent to the row of the high-side IGBTs 100c, 101a to 101c and 110a to 110c and the row of the low-side IGBTs 100d, 101d to 101f and 110d to 110f so as to extend in the direction crossing these rows, and extend in the space between the row of the high-side IGBTs 100c, 101a to 101c and 110a to 110c and the row of low-side IGBTs 100d, 101d to 101f and 110d to 110f in the direction parallel to these rows. However, the layout of the wiring patterns 1000a and 1000 is not limited thereto.

Figure 12:
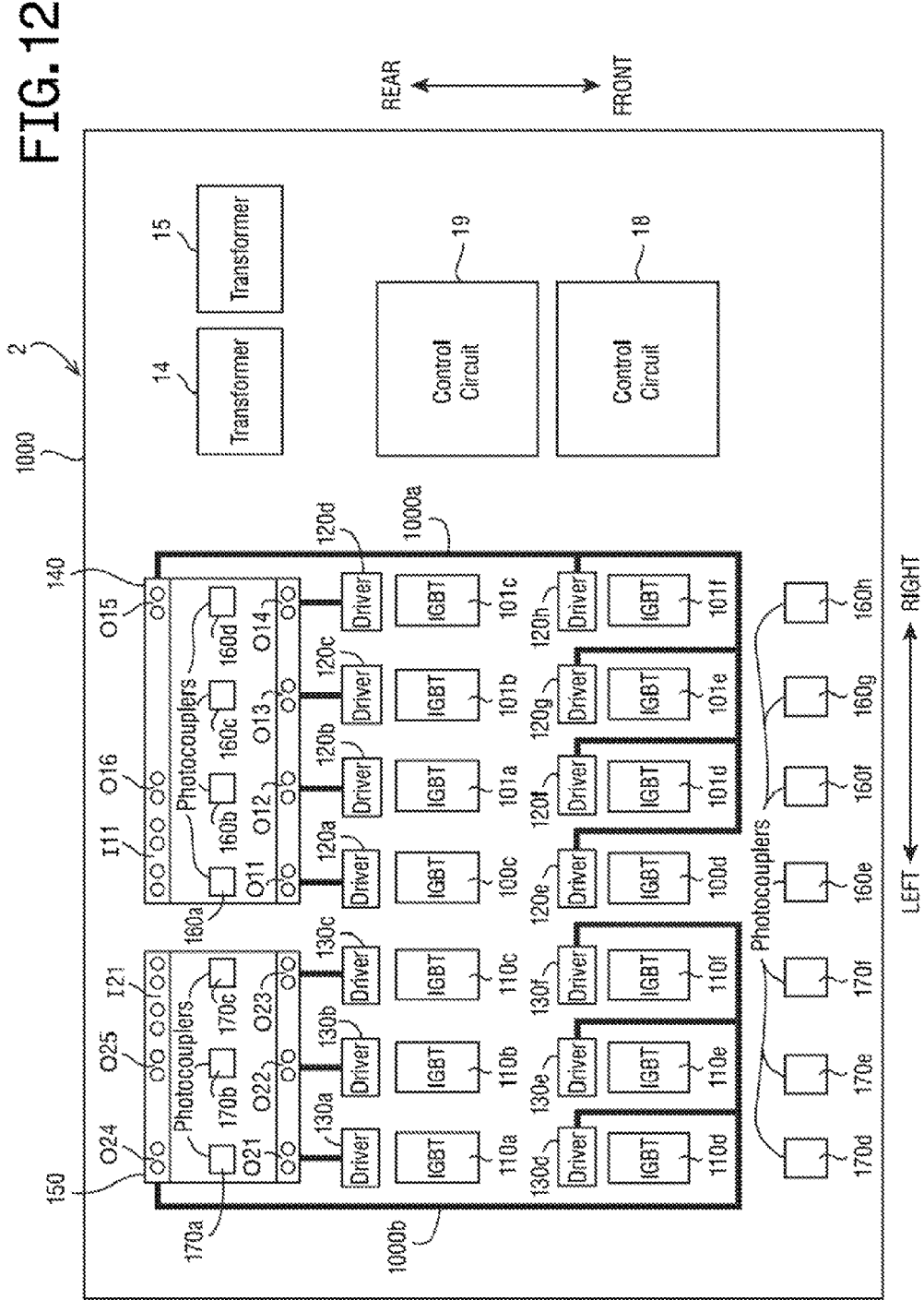
FIG. 12 is a top view of a wiring board of a modification of the motor-generator control apparatus according to the second embodiment of the invention.

For example, as shown in FIG. 12, the wiring patterns 1000a and 1000 may be formed adjacent to the row of the high-side IGBTs 100c, 101a to 101c and 110a to 110c and the row of the low-side IGBTs 100d, 101d to 101f and 110d to 110f so as to extend in the direction crossing these rows, and extend in the direction parallel to the row of the low-side IGBTs 100d, 101d to 101f and 110d to 110f on the opposite side of the high-side IGBTs.

Third Embodiment

Next, a motor-generator control apparatus 3 according to a third embodiment of the invention is described. The third embodiment differs from the first embodiment in the layout of the terminals of the transformer 140 and the wiring patterns extending from the transformer 140 to the low-side driver circuits.

Figure 9:
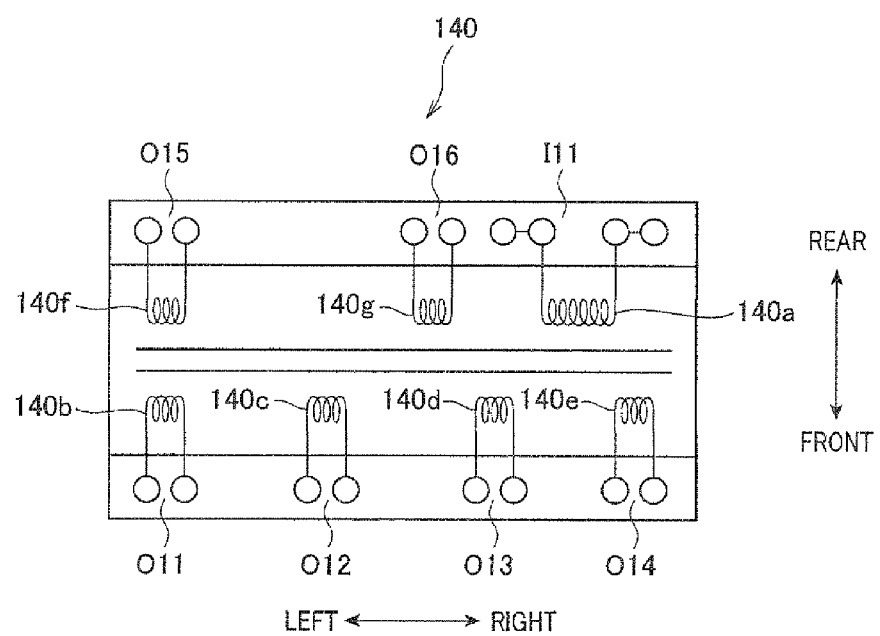
FIG. 9 is a top view of a transformer of one of power supply circuits included in the motor-generator control apparatus of the third embodiment.

First, the layout of the major components of the motor-generator control apparatus 3 is explained with reference to FIGS. 8 and 9. FIG. 8 is a top view of a wiring board of the motor-generator control apparatus 3. In FIG. 8, the wirings each constituted of positive and negative wires patterns and extending from the transformer 140 or 150 to a corresponding one of the driver circuits are shown by heavy lines. FIG. 9 is a top view of the transformer 140. In FIG. 9, the primary coils and secondary coils are shown by thin lines. The descriptions "FRONT-REAR DIRECTION" and "LEFT-RIGHT DIRECTION" are just for explanation purpose. The following description of the third embodiment focuses on the differences with the first embodiment, that is, on the layout of the terminals of the transformer 140 and the layout of the wiring patterns extending from the transformer 140 to the low-side driver circuits.

The circuit structure of the motor-generator control apparatus 3 of the third embodiment is the same as that of the motor-generator control apparatus 1 of the first embodiment.

The transformer 140 is mounted on the top surface of the wiring board 1000 so as to be located rearward of the row of the high-side IGBTs 100c and 110a to 110c. As shown in FIG. 9, the transformer 140 includes at its rear end the output terminal I11 of the primary coil 140a, the output terminal O16 of the secondary coil 140g to measure the output voltage of the transformer 140, and the output terminal O15 to output the voltage to drive the low-side IGBTs 100d and 101d to 101f. The input to/urinal I11 of the primary coil 140a is formed in the right side end, and the output terminal O15 of the secondary coil 140f is formed in the left side end.

As shown in FIG. 8, the wiring pattern 1000a is formed on the top surface of the wiring board 1000 so as to extend in parallel with the wiring pattern 1000b in the front-rear direction on the left side of the row of the high-side IGBTs 100c, 101a to 101c and 110a to 110c and the row of the low-side IGBTs 100d, 101d to 101f and 110d to 110f (that is, on the opposite side of the control circuits), and extend in parallel with the wiring pattern 1000b in the left-right direction in the front of the row of the low-side driver circuits 120e to 120h.

The third embodiment described above provides the following advantages. In the third embodiment, the control circuits 18 and 19 are mounted on the right side of the row of the high-side IGBTs 100c, 101a to 101c and 110a to 110c and the row of the low-side IGBTs 100d, 101d to 101f and 110d to 110f. The wiring patterns 1000a and 1000b are formed so as to extend in the front-rear direction on the left side of the row of the high-side IGBTs 100c, 101a to 101c and 110a to 110c and the row of the low-side IGBTs 100d, 101d to 101f and 110d to 110f (that is, on the opposite side of the control circuits).

Incidentally, when the voltage to drive the low-side IGBTs 100d, 101d to 101f and 110d to 110f is higher than the voltage to drive the control circuits 18 and 19, it is necessary to ensure an insulation distance sufficiently long between the control circuits 18 and 19 and the wiring patterns 1000a and 1000b. However, in this embodiment, the wiring patterns 1000a and 1000b are formed so as to extend in the front-rear direction on the right side of the row of the high-side IGBTs 100d, 101a to 101c and 110a to 110c, and the row of the low-side IGBTs 100d, 101d to 101f and 110d to 110f, that is, on the opposite side of the control circuits. Accordingly, in this embodiment, the wiring patterns 1000a and 1000b are not located immediately adjacent to the control circuits 18 and 19. Hence, it is not necessary to purposely provide the insulation distance. Accordingly, according to this embodiment, the wiring board 1000 can be made compact in size compared to the case where the wiring patterns 1000a and 1000b are formed immediately adjacent to the control circuits 18 and 19.

The third embodiment describes an example in which the wiring patterns 1000a and 1000b are formed adjacent to the row of the high-side IGBTs 100c, 101a to 101c and 110a to 110c and the row of the low-side IGBTs 100d, 101d to 101f and 110d to 110f so as to extend in the direction crossing these rows, and extend in the direction parallel to the row of the low-side IGBTs 100d, 101d to 101f and 110d to 110f on the opposite side of the high-side IGBTs. However, the layout of the wiring patterns 1000a and 1000 is not limited thereto.

Figure 13:
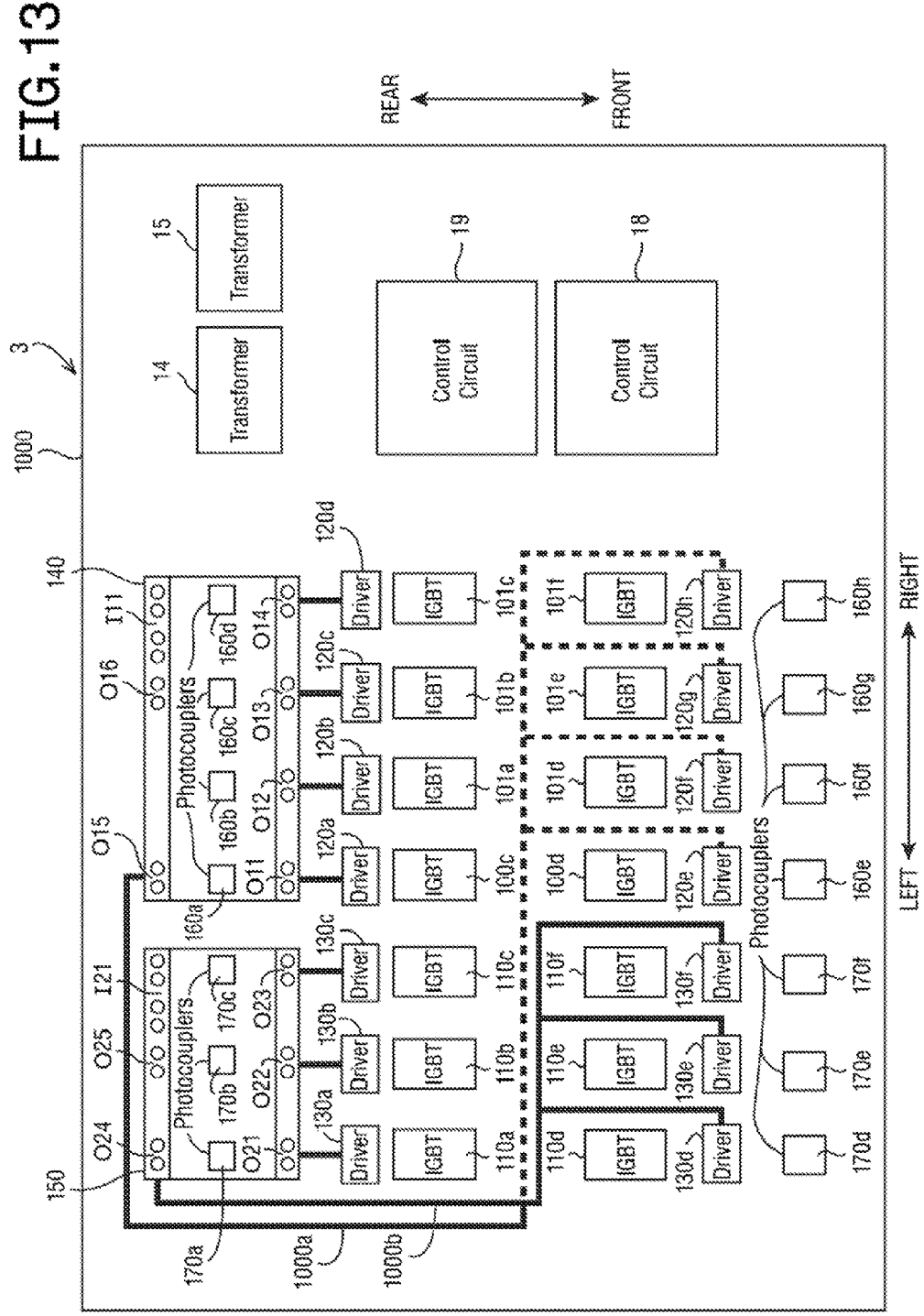
FIG. 13 is a top view of a wiring board of a modification of the motor-generator control apparatus according to the third embodiment of the invention.

For example, as shown in FIG. 13, the wiring pattern 1000a may be formed on the top surface of the wiring board 1000 adjacent to the row of the high-side IGBTs 100c, 101a to 101c and 110a to 110c and the row of the low-side IGBTs 100d, 101d to 101f and 110d to 110f so as to extend in the direction crossing these rows, and extend in the space between the row of the high-side IGBTs 100c, 101a to 101c and 110a to 110c and the row of low-side IGBTs 100d, 101d to 101f and 110d to 110f in the direction parallel to these rows.

Further, wiring pattern 1000b may be formed on the top surface of the wiring board 1000 adjacent to the row of the high-side IGBTs 100c, 101a to 101c and 110a to 110c and the row of the low-side IGBTs 100d, 101d to 101f and 110d to 110f so as to extend in the direction crossing these rows, and extend in the space between the row of the high-side IGBTs 110a to 110c and the row of the low-side IGBTs 110d to 110f in the direction parallel to these rows.

Fourth Embodiment

Next, a motor-generator control apparatus 4 according to a fourth embodiment of the invention is described. The fourth embodiment differs from the third embodiment in the layout of the low-side driver circuits and the associated wiring patterns.

Figure 10:
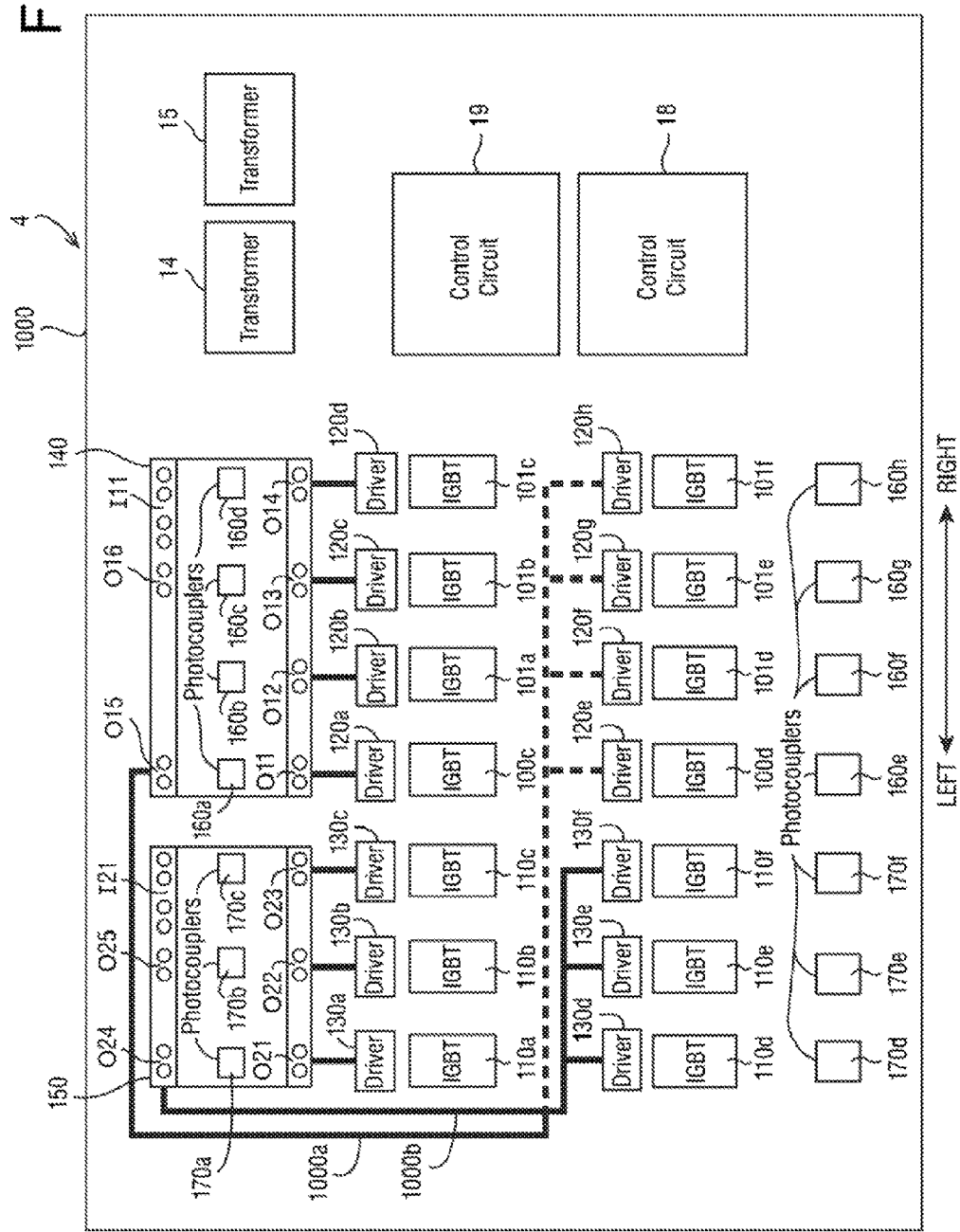
FIG. 10 is a top view of a wiring board of a motor-generator control apparatus according to a fourth embodiment of the invention.

First, the layout of the major components and the wiring patterns of the motor-generator control apparatus 4 is explained with reference to FIG. 10. FIG. 10 is a top view of a wiring board of the motor-generator control apparatus 4. In FIG. 10, the wirings each constituted of positive and negative wires patterns and extending from the transformer 140 or 150 to a corresponding one of the driver circuits are shown by heavy lines. The descriptions "FRONT-REAR DIREC- TION" and "LEFT-RIGHT DIRECTION" are just for explanation purpose. The following description of the fourth embodiment focuses on the differences with the third embodiment, that is, on the layout of the major components and the wiring patterns.

The circuit structure of the motor-generator control apparatus 4 of the fourth embodiment is the same as that of the motor-generator control apparatus 1 of the first embodiment. Accordingly, the circuit structure of the motor-generator control apparatus 4 of the fourth embodiment is the same as that of the motor-generator control apparatus 3 of the third embodiment.

The low-side driver circuits 120*e* to 120*h* are mounted in a row on the top surface of the wiring board 1000 side by side with the row of the low-side IGBTs 100*d* and 101*d* to 101*f* between the row of the high-side IGBTs 100*c*, and 101*a* to 101*c*, and the row of the low-side IGBTs 100*d* and 101*d* to 101*f*. The wiring pattern 1000*a* is formed on the top surface of the wiring board 1000 so as to extend in the front-rear direction parallel to the wiring pattern 1000*b* on the left side of the row of the high-side IGBTs 100*c*, 101*a* to 101*c* and 110*a* to 110*c* and the row of the low-side IGBTs 100*d*, 101*d* to 101*f* and 110*d* to 110*f* (that is, on the opposite side of the control circuits), and formed on the bottom surface of the wiring board 1000 so as to extend in the left-right direction parallel to the wiring pattern 1000*b* between the row of the high-side IGBTs 100*c*, 101*a*, to 101*c* and 110*a* to 110*c* and the low-side driver circuits 120*e* to 120*h* and 130*d* to 130*f*.

The second embodiment described above provides the following advantages. The fourth embodiment provides the similar advantages to those provided by the third advantages.

In the fourth embodiment, the wiring patterns 1000*a* and 1000*b* are formed adjacent to the row of the high-side IGBTs 100*c*, 101*a* to 101*f* and 110*a* to 110*c* and the row of the low-side IGBTs 100*d*, 101*d* to 101*f* and 110*d* to 110*f* so as to extend in the direction crossing these rows, and also extend in the space between the row of the high-side IGBTs 100*c*, 101*a* to 101*c* and 110*a* to 110*c* and the row of low-side IGBTs 100*d*, 101*d* to 101*f* and 110*d* to 110*f* in the direction parallel to these rows. However, the layout of the wiring patterns 1000*a* and 1000 is not limited thereto.

Figure 14:
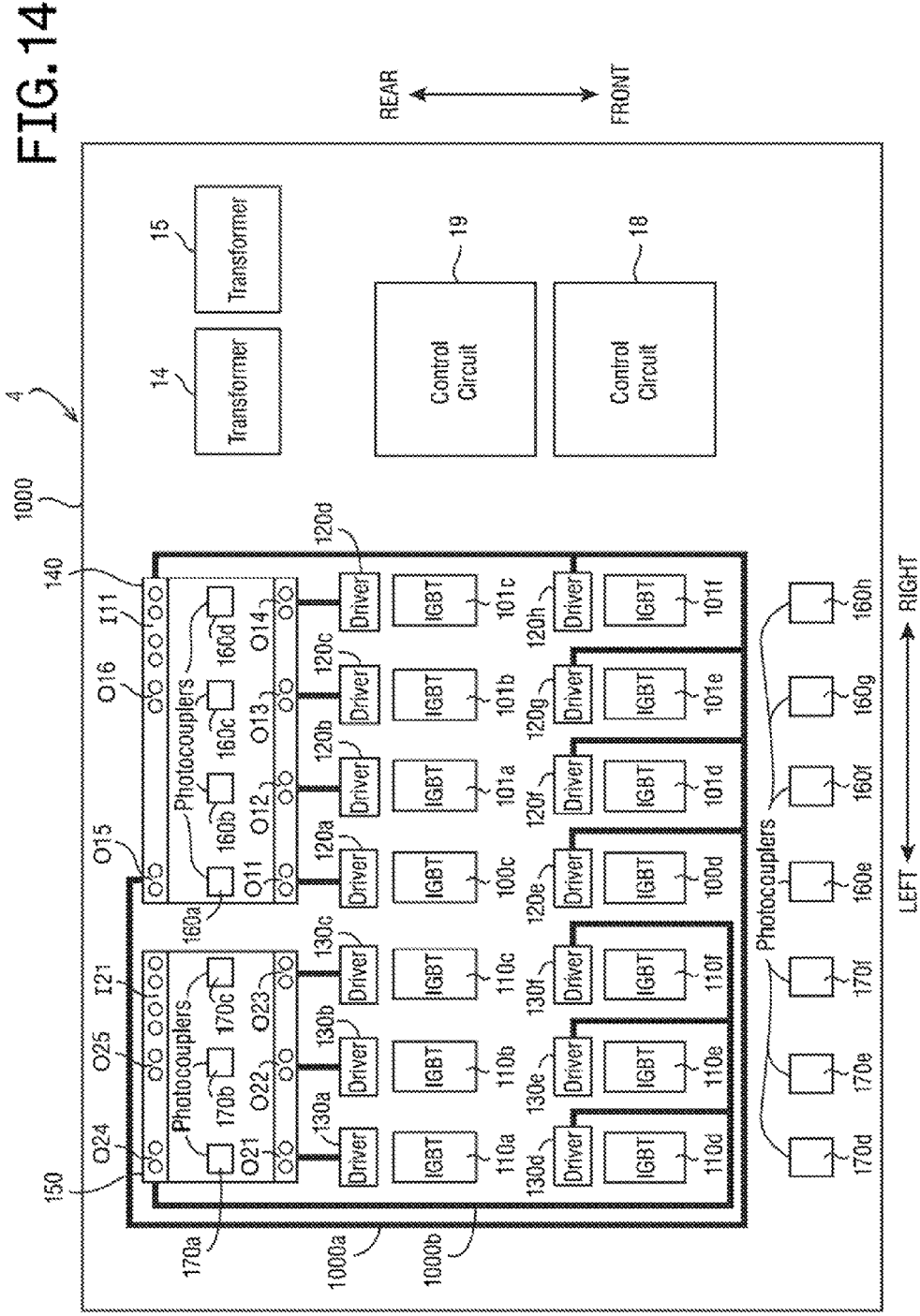
FIG. 14 is a top view of a wiring board of a modification of the motor-generator control apparatus according to the fourth embodiment of the invention.

For example, as shown in FIG. 14, the wiring patterns 1000*a* and 1000 may be formed on the upper surface of the wiring board 1000 adjacent to the row of the high-side IGBTs 100*c*, 101*a* to 101*c* and 110*a* to 110*c* and the row of the low-side IGBTs 100*d*, 101*d* to 101*f* and 110*d* to 110*f* so as to extend in the direction crossing these rows, and also extend in the direction parallel to the row of the low-side IGBTs 100*d*, 101*d* to 101*f* and 110*d* to 110*f* on the opposite side of the high-side IGBTs.

Fifth Embodiment

Next, a motor-generator control apparatus 5 according to a fifth embodiment of the invention is described. The fifth embodiment differs from the third embodiment in the layout of the wiring pattern 1000*a* extending from the transformer 140 to the low-side driver circuits.

Figure 15:
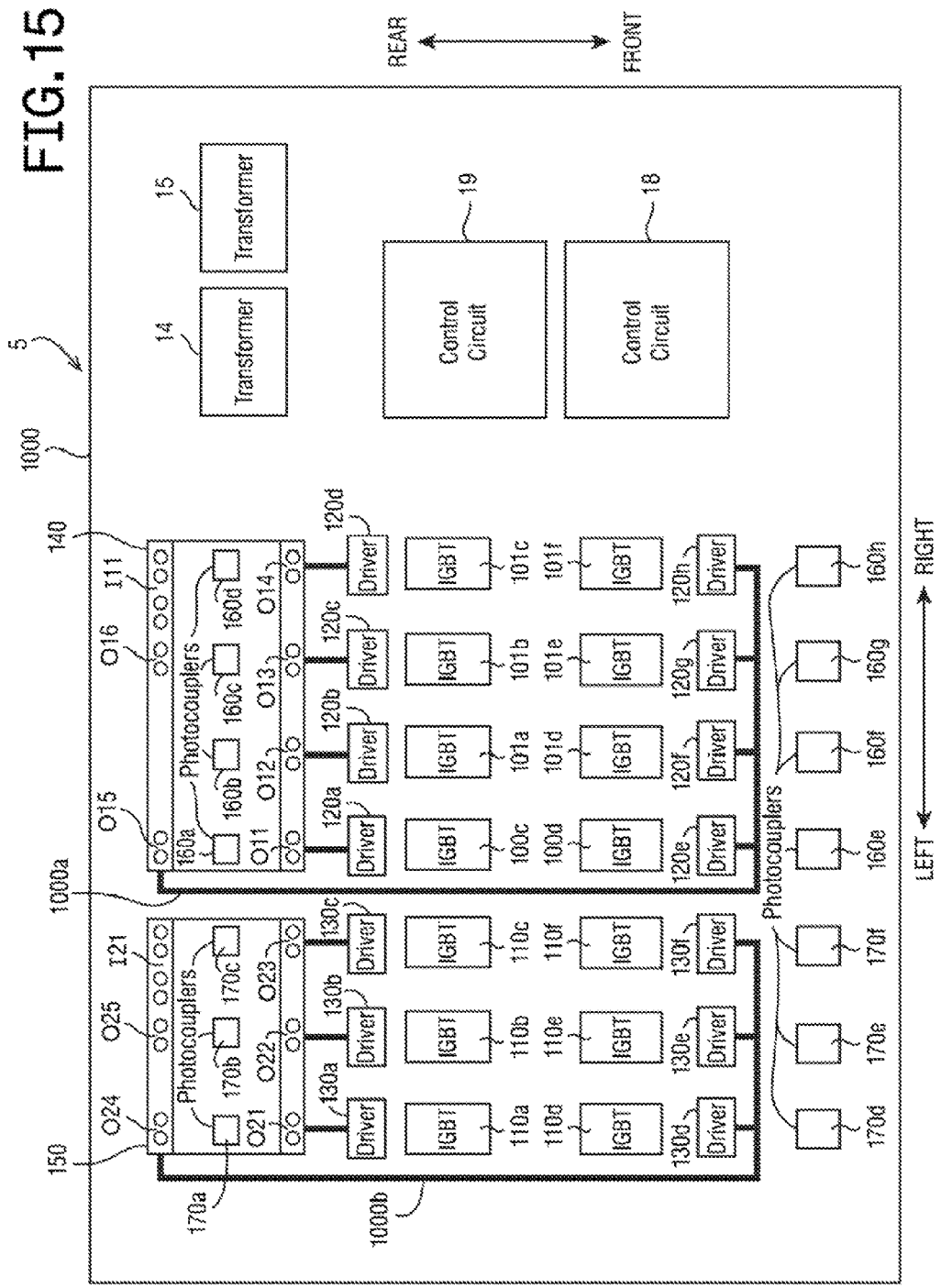
FIG. 15 is a top view of a wiring board of a motor-generator control apparatus according to a fifth embodiment of the invention.

First, the layout of the wiring pattern 1000*a* is explained with reference to FIG. 15. FIG. 15 is a top view of a wiring board of the motor-generator control apparatus 5. In FIG. 15, the wirings each constituting of positive and negative wires patterns extending from each transformer to the respective driver circuits are shown by a heavy line. The descriptions "FRONT-REAR DIRECTION" and "LEFT-RIGHT DIRECTION" are just for explanation purpose. The following description of the fifth embodiment focuses on differences with the third embodiment, that is, on the layout of the wiring patterns.

The circuit structure of the motor-generator control apparatus 5 of the fifth embodiment is the same as that of the motor-generator control apparatus 1 of the first embodiment. Accordingly, the circuit structure of the motor-generator control apparatus 5 of the fifth embodiment is the same as that of the motor-generator control apparatus 3 of the third embodiment.

The wiring pattern 1000*a* is formed on the top surface of the wiring board 1000 in the front-rear direction on the left side of the row of the high-side IGBTs 100*c* and 101*a* to 101*c* and the row of the low-side IGBTs 100*d* and 101*d* to 101*f* (that is, on the opposite side of the control circuits), and also extend in the left-right direction in the front of the row of the low-side driver circuits 120*e* to 120*h*.

The fifth embodiment provides the similar advantages to those provided by the third advantages.

The fifth embodiment describes an example in which the wiring pattern 1000*a* is formed adjacent to the row of the high-side IGBTs 100*c* and 101*a* to 101*c* and the row of the low-side IGBTs 100*d* and 101*d* to 101*f* (that is, on the opposite side of the control circuits) so as to extend in the direction crossing these rows. However, the layout of the wiring pattern 1000*a* is not limited thereto.

Figure 16:
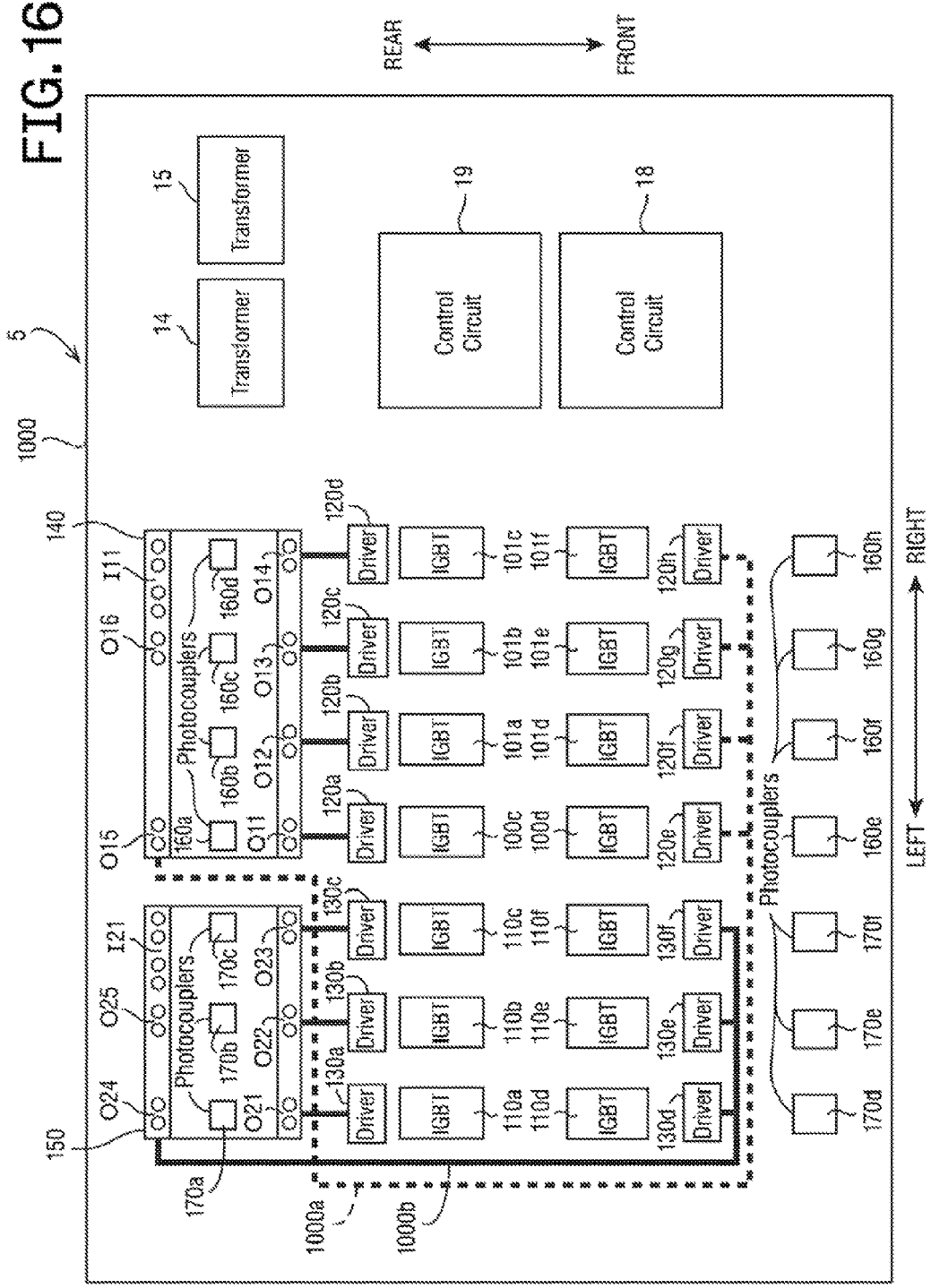
FIG. 16 is a top view of a wiring board of a modification of the motor-generator control apparatus according to the fifth embodiment of the invention.

For example, as shown in FIG. 16, the wiring pattern 1000*a* may be formed on the bottom surface of the wiring board 1000 so as to be adjacent to the row of the high-side IGBTs 100*c*, 101*a* to 101*c* and 110*a* to 110*c*, and the row of the low-side IGBTs 100*d*, 101*d* to 101*f* and 110*d* to 110*f* (that is, on the opposite side of the control circuits), and extend in the direction crossing the direction of these rows.

Further, the wiring pattern 1000*a* may be formed so as to be adjacent to the row of the high-side IGBTs 100*c* and 101*a* to 101*c*, and the row of the low-side IGBTs 100*d* and 101*d* to 101*f* (that is, on the side of the control circuits), and extend in the direction crossing the direction of these rows.

Figure 17:
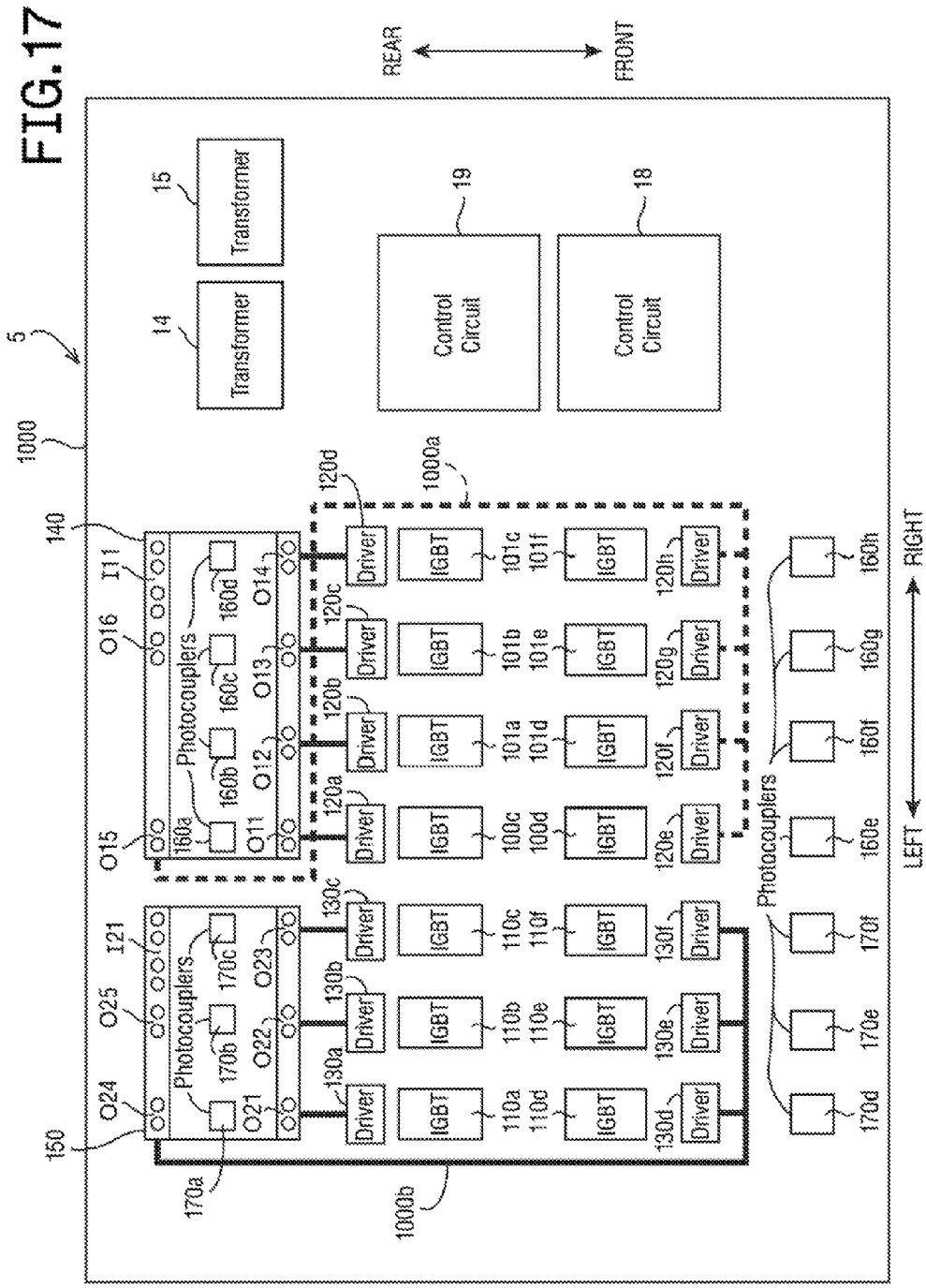
FIG. 17 is a top view of a wiring board of another modification of the motor-generator control apparatus according to the fifth embodiment of the invention.

In this embodiment, as shown in FIGS. 15 to 17, the wiring pattern 1000*a* is formed so as to extend parallel to the row of the low-side IGBTs 100*d*, 101*d* to 101*f* and 110*d* to 110*f* on the side opposite to the high-side IGBTs. However, the wiring pattern 1000*a* may be formed so as to extend in the space between the row of the high-side IGBTs 100*c*, 101*a* to 101*c* and 110*a* to 110*c* and the row of the low-side IGBTs 100*d*, 101*d* to 101*f* and 110*d* to 110*f* in the direction parallel to these rows.

Sixth Embodiment

Next, a motor-generator control apparatus 6 according to a sixth embodiment of the invention is described. The sixth embodiment is distinguished from the first to fifth embodiments in the layout of some of the capacitors included in the power supply circuits 14 or 15.

Figure 18:
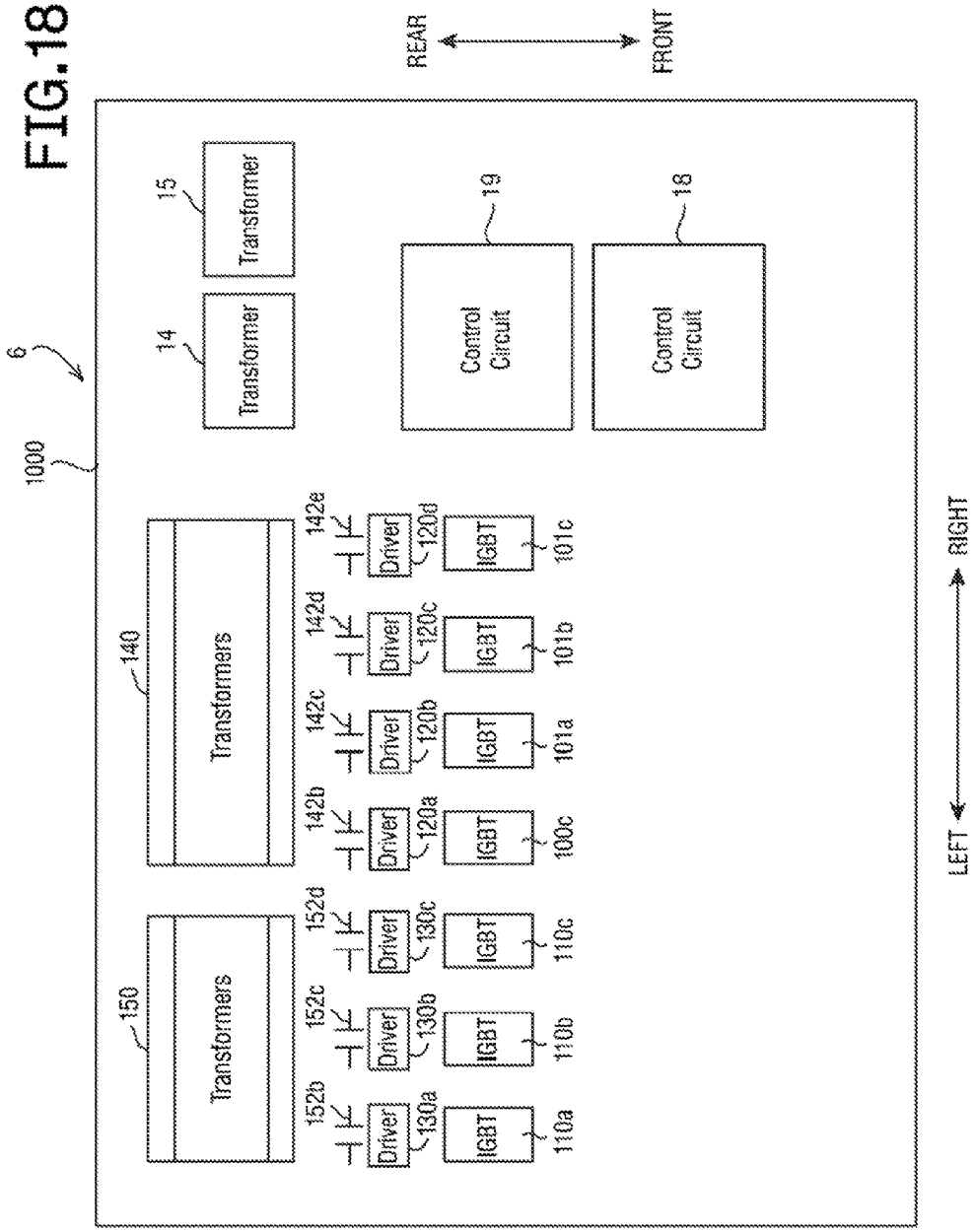
FIG. 18 is a top view of a wiring board of a motor-generator control apparatus according to a sixth embodiment of the invention.

First, the layout of the capacitors is explained with reference to FIG. 18. FIG. 18 is a top view of a wiring board of the motor-generator control apparatus 6. The descriptions "FRONT-REAR DIRECTION" and "LEFT-RIGHT DIRECTION" are just for explanation purpose. The following description of the sixth embodiment focuses on the differences with the first to fifth embodiments, that is, on the layout or 15.

The circuit structure of the motor-generator control apparatus 6 of the sixth embodiment is the same as that of the motor-generator control apparatus 1 of the first embodiment. Accordingly, the circuit structure of the motor-generator control apparatus 6 of the sixth embodiment is the same as that of each of the motor-generator control apparatuses 2 to 5 of the second to fifth embodiments.

The capacitors 142b to 142e included in the power supply circuit 14 and the capacitors 152b to 152d included in the power supply circuit 15 are formed on the top surface of the wiring board 1000 so as to be located between the high-side driver circuits 120a to 120d and 130a to 130c and the transformers 140 and 150.

The sixth embodiment described above provides the following advantages. According to this embodiment, it is possible to mount the capacitors 142b to 142e and 152b to 152d for smoothing the voltage to drive the high-side IGBTs 100c, 101a to 101c and 110a to 110c in the vicinity of the high-side driver circuits 120a to 120d and 130a to 130c. This makes it possible to use the capacitors 142b to 142e and 152b to 152d as power supply stabilizing means for the high-side driver circuits 120a to 120d and 130a to 130c.

Figure 19:
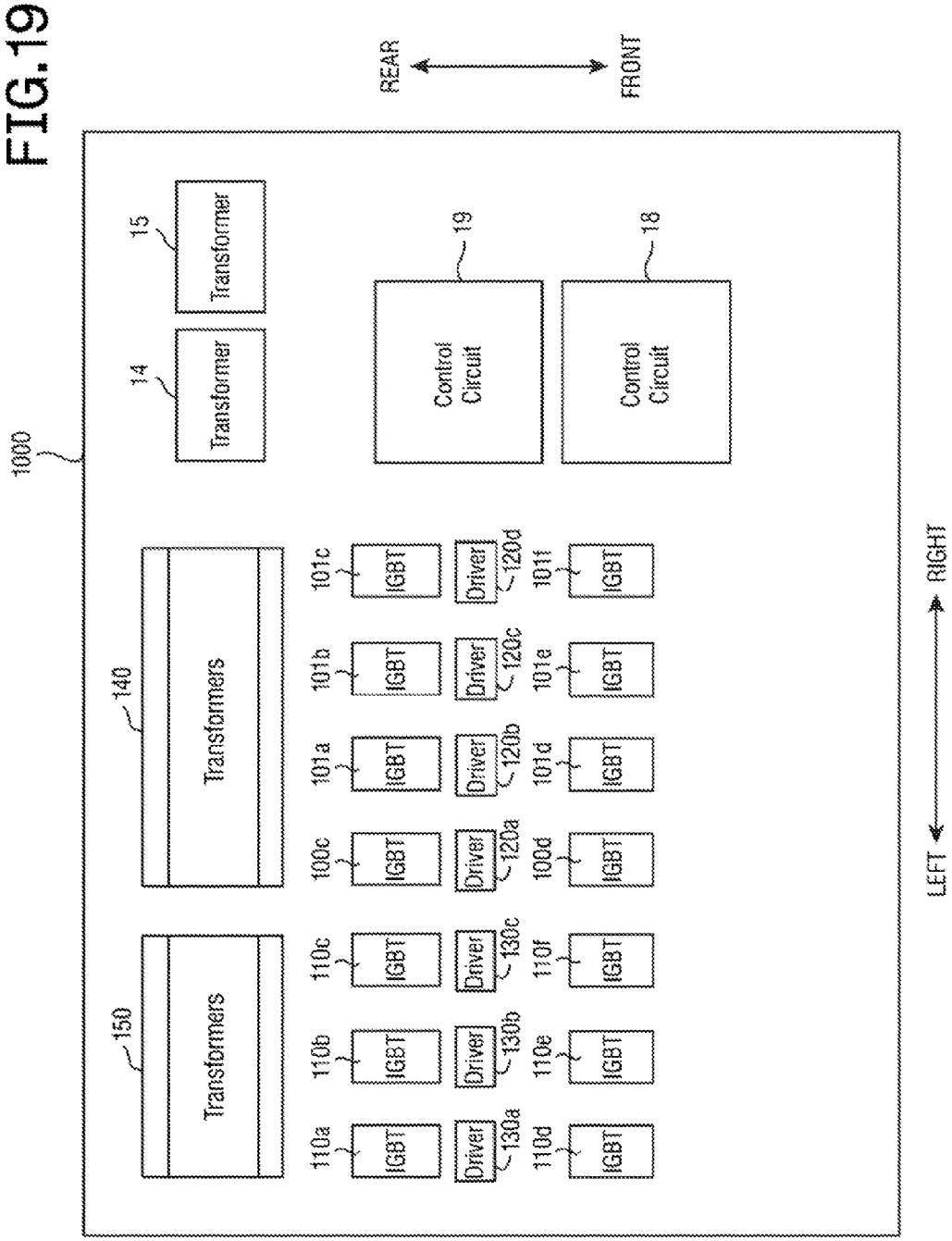
FIG. 19 is a top view of a wiring board of a further modification of the motor-generator control apparatus of each of the first to sixth embodiments according to the invention.

Incidentally, each of the first to sixth embodiments describes an example in which the high-side driver circuits 120a to 120d and 130a to 130c are mounted between the row of the high-side IGBTs 100c, 101a to 101c and 110a to 110c and the transformers 140 and 150. However, the layout of the high-side driver circuits 120a to 120d and 130a to 130c is not limited thereto. For example, as shown in FIG. 19, the high-side driver circuits 120a to 120d and 130a to 130c may be mounted between the row of the high-side IGBTs 100c, 101a to 101c and 110a to 110c and the row of the low-side IGBTs 100d, 101d to 101f and 110d to 110f. For another example, as shown in FIG. 20, the high-side driver circuits 120a to 120d and 130a to 130c and the low-side driver circuits 120e to 120h and 130d to 130f may be mounted between the row of the high-side IGBTs 100c, 101a to 101c and 110a to 110c and the row of the low-side IGBTs 100d, 101d to 101f and 110d to 110f. In this case, the high-side driver circuits and the low-side driver circuits located adjacent to each other in the front-rear direction may be formed integrally with each other.

Each of the first to sixth embodiments describes an example in which the transformers 140 and 150 are surface-mounted on the top surface of the wiring board 1000. However, the transformers 140 and 150 may be either of the surface mount type or insertion mount type. However, the transformers of the surface mount type can be mounted more easily than the transformers of the insertion mount type.

Each of the first to sixth embodiments describes an example in which the power conversion circuit is constituted of a parallel connection of three parallel-connected pairs of the high-side and low-side IGBTs connected in series and four parallel-connected pairs of the high-side and low-side IGBTs connected in series. However, the structure of the power conversion circuit is not limited thereto. For example, the power conversion circuit may be constituted of a parallel connection of two parallel-connected sets of the high-side and low-side IGBTs connected in series, or of a parallel connection of five or more parallel-connected sets of the high-side and low-side IGBTs connected in series. In short, the power conversion circuit may have any structure constituted of a plurality of parallel-connected sets of the high-side and low-side IGBTs connected in series.

The above explained preferred embodiments are exemplary of the invention of the present application which is described solely by the claims appended below. It should be understood that modifications of the preferred embodiments may be made as would occur to one of skill in the art.

What is claimed is:

1. A power conversion apparatus comprising:
   a power conversion circuit constituted of parallel-connected pairs of a high-side switching element and a low-side switching element connected in series;
   high-side driver circuits to drive the high-side switching elements;
   low-side driver circuits to drive the low-side switching elements; and
   a transformer to individually supply a voltage to drive the high-side switching elements to the high-side driver circuits, and commonly supply a voltage for driving the low-side switching elements to the low-side driver circuits;
   wherein the high-side switching elements are mounted in a row on a wiring board, the low-side switching elements are mounted in a row on the wiring board side by side with the row of the high-side switching elements, and the transformer is mounted on the wiring board on the side of the row of the high-side switching elements opposite to the row of the low-side switching elements.

2. The power conversion apparatus according to claim 1, wherein the high-side driver circuits are mounted on the wiring board between the row of the high-side switching elements and the row of the low-side switching elements.

3. The power conversion apparatus according to claim 1, wherein the low-side driver circuits are mounted on the wiring board between the row of the high-side switching elements and the row of the low-side switching elements.

4. The power conversion apparatus according to claim 1, wherein capacitors for smoothing the voltage to drive the high-side switching elements are mounted on the wiring board between the high-side driver circuits and the transformer.

5. The power conversion apparatus according to claim 1, wherein the transformer is a surface-mount type transformer.

6. The power conversion apparatus according to claim 1, wherein the power conversion apparatus is mounted on a vehicle.

7. The power conversion apparatus according to claim 1, wherein the high-side driver circuits are mounted on the wiring board between the row of the high-side switching elements and the transformer.

8. The power conversion apparatus according to claim 7, wherein output terminals for outputting the voltage to drive the high-side driver circuits are located on the side of the high-side switching elements of the transformer.

9. The power conversion apparatus according to claim 1, wherein the low-side driver circuits are mounted on the wiring board on the side of the row of the low-side switching elements opposite to the row of the high-side switching elements.

10. The power conversion apparatus according to claim 9, wherein a wiring pattern for passing a voltage from the transformer to the low-side driver circuits is located adjacent to a row direction of the high-side switching elements and the row of the low-side switching elements, and extending in a direction crossing the row direction, the wiring pattern further extending in the row direction between the row of the low-side switching elements and the row of the low-side switching elements.

11. The power conversion apparatus according to claim 9, wherein a wiring pattern for supplying a voltage from the transformer to the low-side driver circuits is located adjacent to a row direction of the high-side switching elements and the low-side switching elements, and extending in a direction crossing the row direction, the wiring pattern further extending in the row direction on the side of the row of the low-side switching elements opposite to the row of the high-side switching elements.

12. The power conversion apparatus according to claim 11, wherein output terminals for outputting the voltage to drive the low-side switching elements are formed in an end portion of the transformer with respect to the row direction.

13. The power conversion apparatus according to claim 11, further comprising a control circuit to output a drive signal to the high-side driver circuits and the low-side driver circuits, the control circuit being mounted on the wiring board adjacent to the row direction of the high-side switching elements and the low-side switching elements, the wiring pattern for supplying a voltage from the transformer to the low-side switching elements extending in a direction crossing the row direction on the side of the high-side switching elements and the low-side switching elements opposite to the control circuit.

14. The power conversion apparatus according to claim 13, further comprising high-side signal transmitting elements to transmit the drive signal from the transformer to the high-side driver circuits in a state of the drive signal being electrically insulated, the transformer being mounted on one surface of the wiring board, the high-side signal transmitting elements being mounted on the other surface of the wiring board so as to be located opposite to the transformer.

15. The power conversion apparatus according to claim 13, further comprising low-side signal transmitting elements to transmit the drive signal from the control circuit to the low-side driver circuits in a state of the drive signal being electrically insulated, the low-side signal transmitting elements being mounted on the wiring board on the side of the row of the low-side switching elements opposite to the row of the high-side switching elements.

* * * * *